United States Patent [19]
Dummermuth

[11] 3,942,158
[45] Mar. 2, 1976

[54] PROGRAMMABLE LOGIC CONTROLLER

[75] Inventor: Ernst Dummermuth, Chesterland, Ohio

[73] Assignee: Allen-Bradley Company, Milwaukee, Wis.

[22] Filed: May 24, 1974

[21] Appl. No.: 473,149

[52] U.S. Cl. .............................................. 340/172.5
[51] Int. Cl.² .......................... G06F 7/00; G06F 9/06
[58] Field of Search ................................. 340/172.5

[56] References Cited
UNITED STATES PATENTS

| | | | |
|---|---|---|---|
| 3,624,611 | 11/1971 | Wirsing | 340/172.5 |
| 3,651,484 | 3/1972 | Smeallie | 340/172.5 |
| 3,731,279 | 5/1973 | Halsall et al. | 340/172.5 |
| 3,827,030 | 7/1974 | Seipp | 340/172.5 |

Primary Examiner—David H. Malzahn
Attorney, Agent, or Firm—Quarles & Brady

[57] ABSTRACT

A programmable controller includes a processor which executes a control program to alter the state of an output image table stored in a read/write memory in response to the state of an input image table stored in the memory. An input/output scanner circuit connects directly to the read/write memory and periodically steals a memory cycle from the processor to couple the status of input and output devices with corresponding bits in the input and output image tables. The rate at which the scanner circuit operates is independent of the processor speed and is selected to accommodate the input/output interface circuitry on the programmable controller.

21 Claims, 18 Drawing Figures

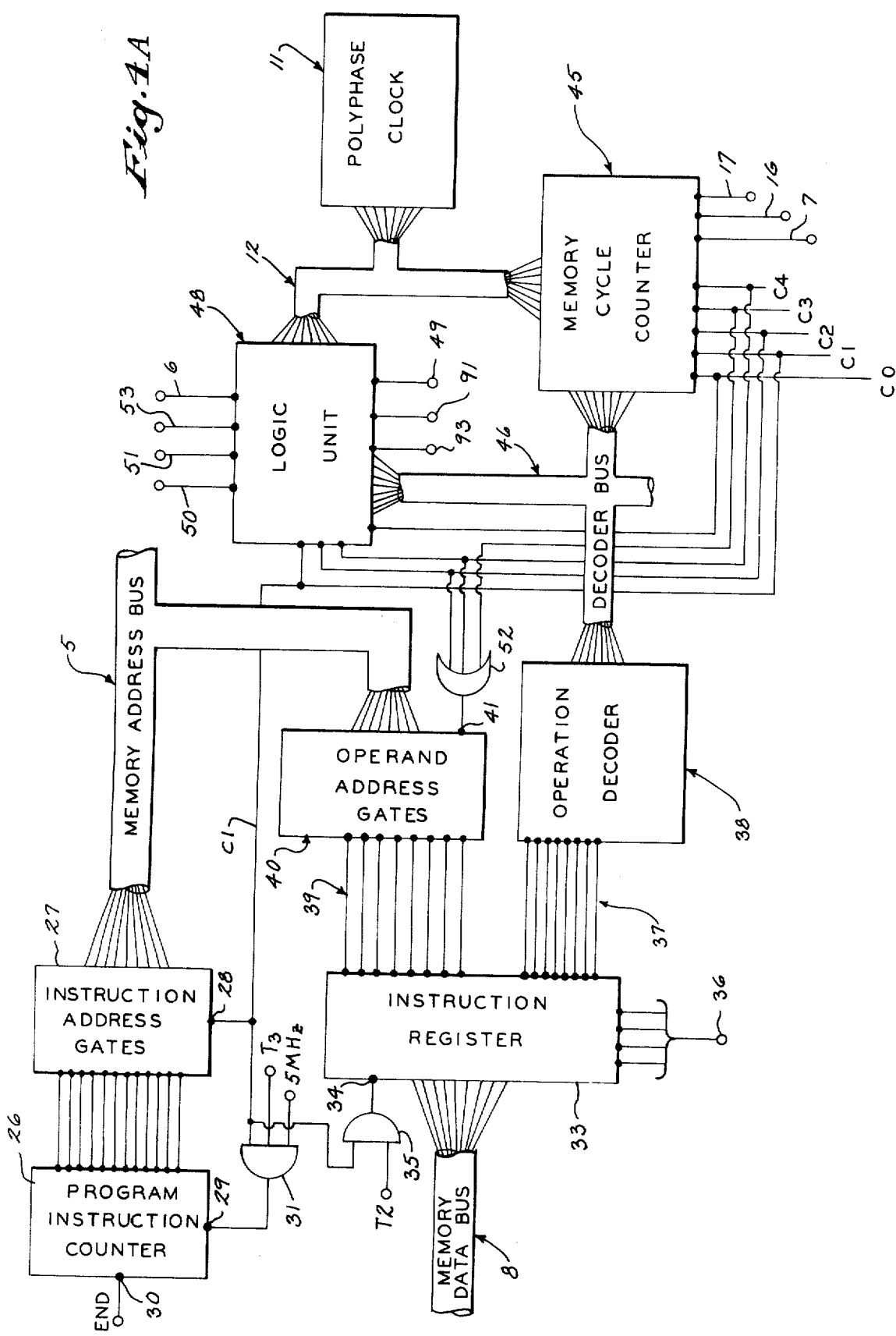

PROGRAMMABLE LOGIC CONTROLLER

BACKGROUND OF THE INVENTION

The field of the invention is programmable controllers such as that disclosed in U.S. Pat. No. 3,810,118 issued to William W. Kiffmeyer on May 7, 1974 and entitled "Programmable Matrix Controller".

Programmable controllers are typically connected to industrial equipment such as assembly lines and machine tools to sequentially operate the system in accordance with a stored control program. In programmable controllers such as that disclosed in the above cited patent, for example, the control program is stored in a random access memory and includes sets of instructions which are executed in rapid sequence to examine the condition of selected input devices on the controlled system and instructions which energize or deenergize selected output devices on the controlled system contingent upon the status of one or more of the examined input devices. The response of the controlled system to changing conditions is directly related to the time it takes to scan the entire control program, and because the control program is executed at a fixed rate, the time necessary to cycle through it is a constraint on the complexity of the system which can be controlled by the programmable controller.

Although the time necessary to scan through a given control program can be decreased by increasing the rate at which the program instructions are executed, there is a limit to such an approach in programmable controllers such as that disclosed in the above cited patent. More specifically, the rate at which input information is received by the programmable cntroller processor from its input circuits and the rate at which it generates output information to its output circuits is limited by propagation times and the time delays which are associated with the noise immunity circuitry. Therefore, in prior programmable controllers a compromise is made between these conflicting objectives with the result that the program instruction execution rate is reduced and the noise immunizing circuits are kept to a minimum.

SUMMARY OF THE INVENTION

The present invention relates to an improved programmable controller in which the rate at which the controller program is scanned is independent of the rate at which the input and output circuits on the programmable controller are scanned. More specifically, the improved programmable controller includes a random access memory in which an input image table and an output image table are stored along with the controller program; a processor which executes the control program instructions to examine the condition of the input image table and control the condition of the output image table; and a scanner circuit which periodically steals a memory cycle from the processor to couple status data from the controller input circuits to the input image table, and to control the controller output circuits by coupling status data from the output image table. The processor operates on data with the random access memory, and as a result, the speed with which it executes the control program is maximized. On the other hand, the scanner circuit periodically couples status data between the controller input/output circuits and the image tables at a rate which is determined independently of the processor speed. Consequently, the input/output speed of the programmable controller can be optimized to meet the requirements of the input and output interface circuitry.

A general object of the invention is to optimize the rate at which the input and output circuits on a programmable controller are scanned. The rate at which the scanner circuit interrupts the processor to couple status data is substantially less than the rate at which the control program is executed under the direction of the processor. A further reduction in the scanning rate is obtained by coupling words of status data during each interrupt. This parallel data transfer by the scanner circuit insures that input/output data rates are kept to a minimum without reducing the response time of the programmable controller to changing conditions on the controlled system.

A more specific object of the invention is to increase the noise immunity of the input/output interface circuitry on a programmable controller. The low data rates in the input/output circuitry allows the use of line filters and drive circuits which substantially improve the noise immunity of the programmable controller. This in turn allows the use of longer lines to the input/output circuitry and a reduction in expensive and bulky shielding.

Another general object of the invention is to increase the rate at which the control program is executed. High speed logic circuits are used in the processor and random access memory and these are suitably shielded from external noise sources. State of the art data processing speeds can thus be accomplished to execute the control program and manipulate the status data in the input and output image tables.

A more specific object of the invention is to increase the length of the control program without compromising noise immunity requirements or system response time.

Another general object of the invention is to provide means for interfacing a programmable controller with external systems. In addition to the scanner circuit, other circuits may be connected to interrupt the processor and couple data between an external system and the randon access memory. Such systems may include, for example, a computer, an arithmetic unit, or a control program loader such as that disclosed in U.S. Pat. No. 3,798,612 issued to Odo J. Struger et al on Mar. 19, 1974.

The foregoing and other objects and advantages of the invention will appear from the foregoing description. In the description reference is made to the accompanying drawings which form a part hereof, and in which there is shown by way of illustration a preferred embodiment of the invention. Such embodiment does not necessarily represent the full scope of the invention, however, and reference is made to the claims herein for interpreting the breadth of the invention.

BRIEF DESCRIPTION OF THE DRAWINGS

FIGS. 4A and 4B are a block diagram of the processor which forms a part of the programmable controller in FIG. 1.

DESCRIPTION OF THE PREFERRED EMBODIMENT

Figure 1:
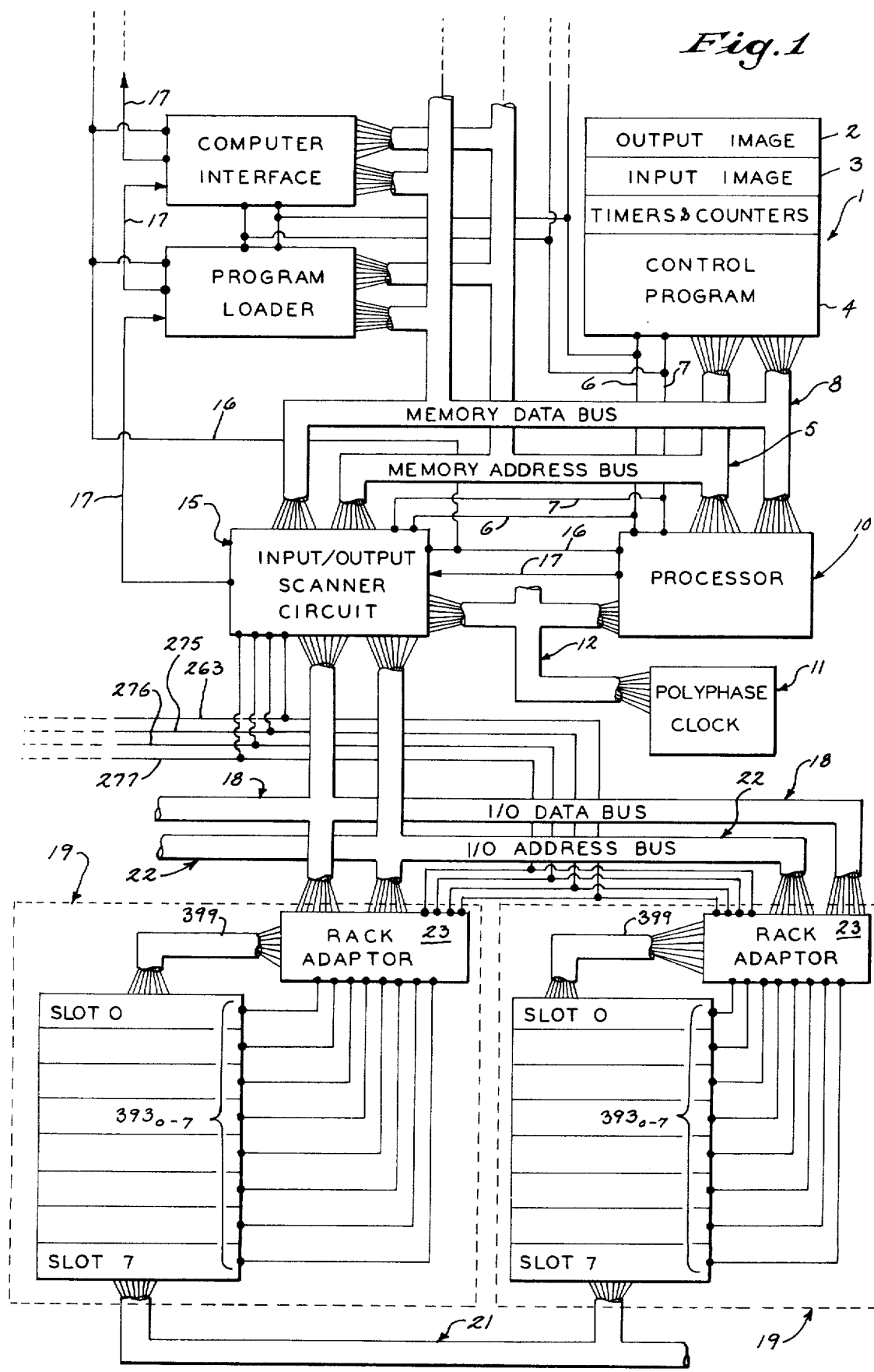
FIG. 1 is a block diagram of the invented programmable controller.

Referring to FIG. 1, the programmable controller of the present invention has a total capacity of 1024 outputs and 1024 inputs. It includes a random access read/write memory 1 which has an 18-bit word length and which includes from 2048 to 8192 separately addressable lines depending upon the size of the control program which it is to store. Two bits in each word stored in the memory 1 are used for parity checking, and thus sixteen data bits are stored on each line of the memory 1. An output image table 2 is stored on the first sixty-four lines of the memory 1 and is addressable with the octal addresses 000–077, an input table 3 is stored on the next sixty-four lines of the memory 1 and is addressable with the octal addresses 100–177, and preset and accumulated values of counters and timers are stored on the next 128 lines of the memory 1 and are addressable with the octal addresses 200–377. The remaining lines of the memory 1 contain a control program 4 in which each program instruction is addressable with an octal address of 400 or greater.

Selected data is read from the memory 1 by applying the octal address of the line containing the data to a memory bus 5 and applying a logic high voltage to a read/write line 6. The memory 1 is cycled by applying a logic high pulse to a memory cycle line 7 and the addressed word is read out on a memory data bus 8. A word is loaded, or written into a selected line of the memory 1 by applying the octal address of that line to the memory address bus 5, applying a logic low voltage to the read/write line 6 and applying a logic high voltage pulse to the memory cycle line 7. The data word appearing on the memory data bus 8 during the one microsecond cycle time of the memory 1 is written onto the selected line.

The control program 4 is executed by a processor 10 which connects to the memory buses 5 and 8 and to the control lines 6 and 7. The processor 10 sequentially reads out the instructions of the control program 4 from the memory 1 and in response to an operation code contained within each program instruction, it performs the operations necessary to carry out the control functions. Such operations include, for example, examining a status bus in the input image table 3 or setting a status bit in the output image 2 to a desired state. Each status bit in the output image table 2 corresponds with an output device such as a motor starter or solenoid on the system being controlled, and each status bit in the input image table 3 corresponds with an input device such as a limit switch or photoelectric cell on the controlled system. As will be described hereinafter, a scanner circuit periodically updates each status bit in the input image table 3 with the status of its corresponding input device on the controlled system and updates the status of the output devices on the controlled system with the status of its corresponding status bit in the output image table 2.

There are three general types of program instructions executed by the processor 10. A program instruction which calls for an operation involving a selected status bit in either the output image table 2 or input image table 3 includes an eight-bit operand address which indicates the memory address of the word containing the desired status bit and a 4-bit pointer that identifies which of the 16 bits in the addressed word is selected. Such program instructions are referred to hereinafter as status bit instructions and they include the following:

TABLE I

| OPERATION | OP CODE | POINTER | OPERAND ADDRESS | Execution Time |
|---|---|---|---|---|
| XIC/XOE | 0 0 1 0 | | | 2 usec. |
| XIO/XOD | 0 0 1 1 | | | |
| OTU | 1 1 0 0 | | | |
| OTL | 1 1 0 1 | | | |
| OTD | 1 1 1 0 | | | 3 usec. |
| OTE | 1 1 1 1 | | | |
| INSTRUCTION BIT NUMBER (OCTAL) | 17 16 15 14 | 13 12 11 10 | 7 6 5 4 3 2 1 0 | |

The mnemonic operation codes for the status bit instructions are briefly defined as follows:

XIC — Examine status bit closed or, is the status bit in a logic 1 state?

XOE — Same as XIC, but refers to a status bit in the output image table.

XIO — Examine status bit open or, is the status bit in a logic 0 state?

XOD — Same as XIO, but refers to a status bit in the output image table.

OTU — If conditions are true turn status bit off, or to a logic 0 state, and if false do nothing.

OTL — If conditions are true turn status bit on, or to a logic 1 state, and if false do nothing.

OTD — If conditions are true turn status bit off and if conditions are false turn status bit on.

OTE — If conditions are true turn status bit on and if conditions are false turn status bit off.

A second general type of program instruction is executed by the processor 10 to perform either a control or logical function. Such instructions are referred to hereinafter as control instructions and are comprised solely of an operation code. They include the following:

CTD — If the conditions are true reduce the count by one.

CTU — If the conditions are true increase the count by one.

PUT — If conditions are true write the number in the processor data accumulator in the selected memory line, otherwise, do nothing.

RTR — If the conditions are true reset the timer.

CTR — If the conditions are true reset the counter.

GET — Fetch the word on the selected memory line and store in the processor data accumulator.

EQU — If the value stored in the processor data accumulator equal to the value stored on the selected memory line?

TABLE II

| OPERATION | | | | OPERATION CODE | | | | | | | | | | | | | Execution Time |
|---|---|---|---|---|---|---|---|---|---|---|---|---|---|---|---|---|---|
| NOP | 0 | 0 | 0 | 0 | 0 | 0 | 0 | 0 | 0 | 0 | 0 | 0 | 0 | 0 | 0 | 0 | |
| BND | 0 | 0 | 0 | 0 | 1 | 1 | 1 | 1 | 1 | 1 | 1 | 1 | 1 | 1 | 1 | 1 | |
| BST | 0 | 0 | 0 | 1 | 1 | 1 | 1 | 1 | 1 | 1 | 1 | 1 | 1 | 1 | 1 | 1 | |
| END | 0 | 0 | 1 | 1 | 1 | 1 | 1 | 1 | 1 | 1 | 1 | 1 | 1 | 1 | 1 | 1 | 1 $\mu$sec. |
| NOP | 1 | 1 | 1 | 1 | 1 | 1 | 1 | 1 | 1 | 1 | 1 | 1 | 1 | 1 | 1 | 1 | |
| INSTRUCTION BIT NUMBER (OCTAL) | 17 | 16 | 15 | 14 | 13 | 12 | 11 | 10 | 7 | 6 | 5 | 4 | 3 | 2 | 1 | 0 | |

The mnemonic operation codes for the control instructions are briefly defined as follows:

NOP — No operation (all bits zero)

BND — Branch end: termination of a Boolean sub-branch

BST — Branch start: opens or begins a Boolean sub-branch

END — End of the control program

NOP — No operation (all bits one)

A third general type of control program instruction is executed by the processor 10 to operate on a data word stored in the memory 1. These instructions are referred to hereinafter as arithmetic instructions and are characterized by an operand address which indicates the address of a data word in the memory 1. They do not include a bit pointer.

LES— Is the value stored in the processor data accumulator less then the value stored on the selected memory line?

Figure 2:
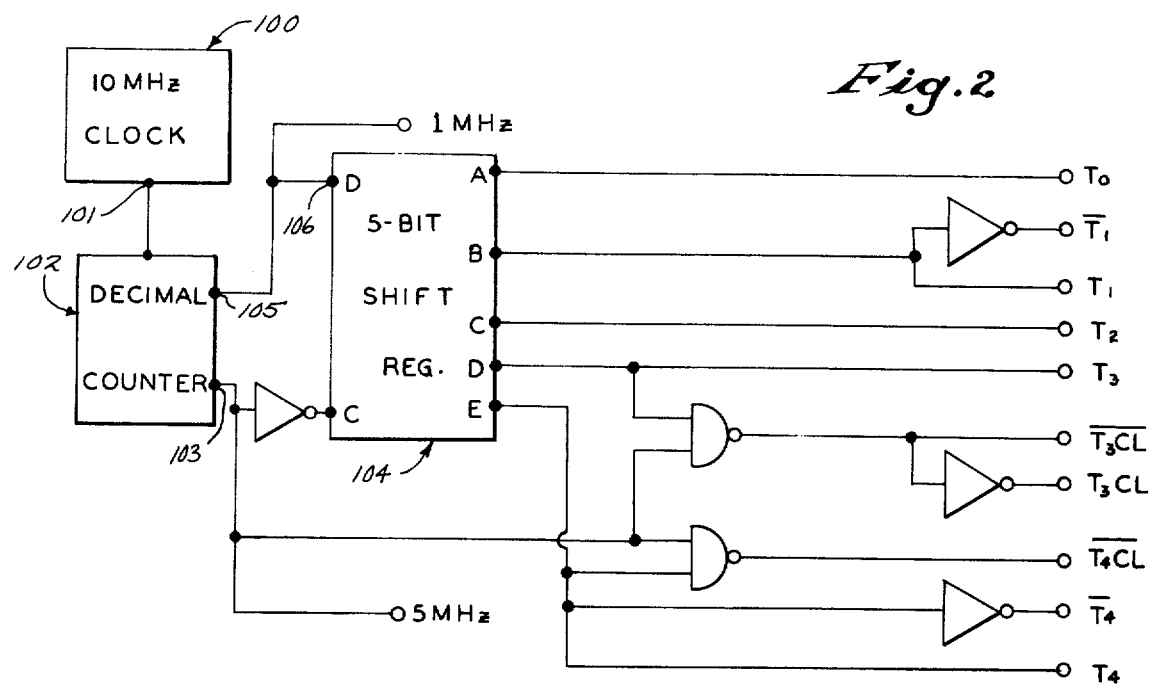
FIG. 2 is an electrical schematic diagram of a polyphase clock which forms part of the programmable controller in FIG. 1.
Figure 3:
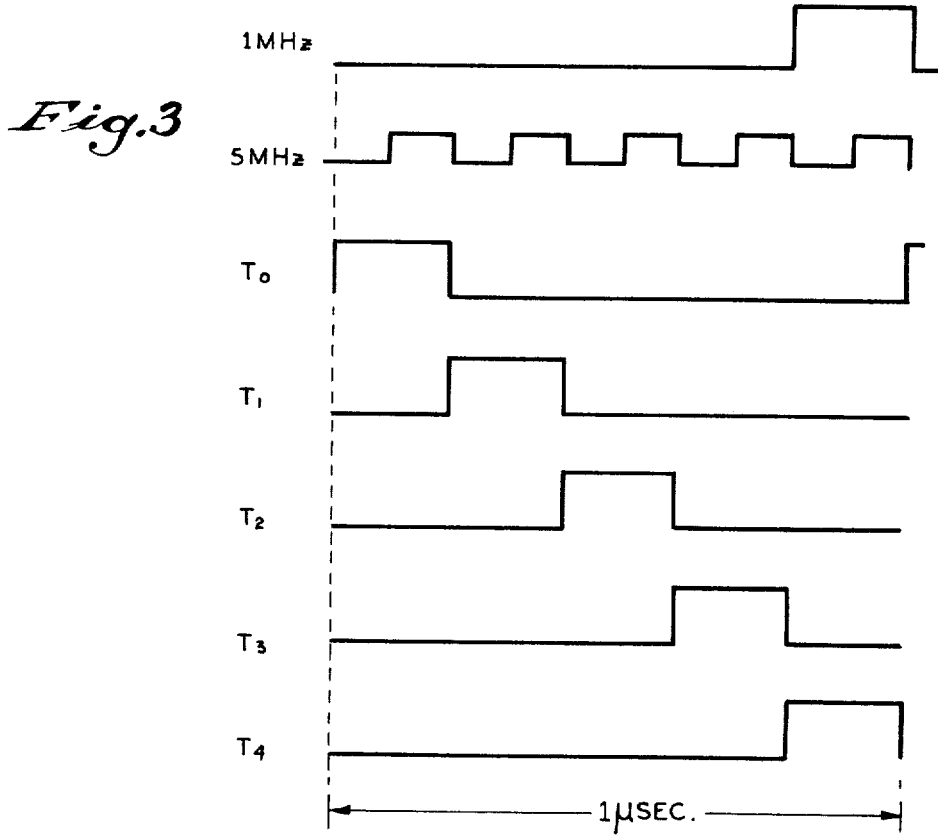
FIG. 3 is a timing diagram for the clock of FIG. 2.

The processor 10 continuously cycles the memory 1 at a rate of 1 megahertz in response to clock pulses generated by a polyphase clock 11. Referring particularly to FIGS. 2 and 3, the polyphase clock 11 includes a 10 megahertz clock pulse generator 100 having an output 101 which connects to the input of a four-bit decimal counter 102. The least significant digit output 103 of the counter 102 connects to a 5 megahertz clock line (5MHz) and through an inverter gate to the clock terminal of a 5-bit shift register 104. The most significant bit output 105 on the counter 102 connects to a 1 megahertz clock line (1 MHz) and to the input terminal 106 of the shift register 104. The shift register 104 is

TABLE III

| OPERATION | | | | OPERATION CODE | | | | | OPERAND ADDRESS | Execution Time |
|---|---|---|---|---|---|---|---|---|---|---|
| TOF 0.1 sec. | 1 | 0 | 0 | 1 | 0 | 0 | 0 | 1 | | |
| TOF 1.0 sec. | 1 | 0 | 0 | 1 | 1 | 0 | 0 | 0 | | |
| TON 0.1 sec. | 1 | 0 | 1 | 0 | 0 | 0 | 0 | 1 | | |
| TON 1.0 sec. | 1 | 0 | 1 | 0 | 1 | 0 | 0 | 0 | | 4 $\mu$sec. |
| RTO 0.1 sec. | 1 | 0 | 1 | 1 | 0 | 0 | 0 | 1 | | |
| RTO 1.0 sec. | 1 | 0 | 1 | 1 | 1 | 0 | 0 | 0 | | |
| CTD | 0 | 1 | 1 | 0 | X | 0 | 0 | X | | |
| CTU | 0 | 1 | 1 | 1 | X | 0 | 0 | X | | |
| PUT | 0 | 1 | 0 | 0 | X | 0 | 1 | X | | |
| RTR | 0 | 1 | 0 | 1 | X | 0 | 1 | X | | |
| CTR | 0 | 1 | 1 | 1 | X | 0 | 1 | X | | |
| GET | 1 | 0 | 0 | 0 | X | 0 | 1 | X | | 2 $\mu$sec. |
| EQU | 1 | 0 | 1 | 0 | X | 0 | 1 | X | | |
| LES | 1 | 0 | 1 | 1 | X | 0 | 1 | X | | |
| INSTRUCTION BIT NUMBER (OCTAL) | 17 | 16 | 15 | 14 | 13 | 12 | 11 | 10 | 7 6 5 4 3 2 1 0 | |

The mnemonic operation codes for the above arithmetic instructions are briefly defined as follows:

TOF — If conditions are true turn output on, otherwise, wait until time is out then turn output off.

TON — If conditions are true wait until time is out then turn output on, otherwise, turn output off.

RTO — If conditions are true wait until time is out then turn output on, otherwise, stop timer.

commercially available from Texas Instruments, Inc. as SN7496 and its respective outputs A–E connect to timing lines identified respectively to T0–T4 and to the inputs of logic gates which combine the T3 and T4 outputs with the 5 MHz clock and invert the T1 and T4 outputs.

The decimal counter 102 applied a logic high voltage to the input 106 of the shift register 104 every microsecond and the logic high is shifted to successive register output terminals A–D by the 5 MHz clock applied to the register clock terminal. As a result, 200 nanosecond timing pulses are successively generated on the lines T0–T4 during each one microsecond cycle of the register 104. These timing signals are used in combination with the 1 MHz and 5 MHz clocks to coordinate the operation of the various elements of the programmable controller during each one microsecond cycle of the memory 1.

Referring again to FIG. 1, each bit in the image tables 2 and 3 of the memory 1 corresponds to an input or output device on the system being controlled. This correspondence is achieved by connecting all of the input and output devices on the system being controlled to separately addressable input and output circuits on the programmable controller. Each status bit of the input image table 3 is periodically updated by coupling the status of the corresponding input devices on the controlled system to the memory 1. This is performed by an input/output scanner circuit 15 which also periodically updates the status of the output devices on the controlled system by coupling the current state of each status bit in the output image table 2 to the programmable controller output circuits. The scanner circuit 15 connects with the clock 11 through the timing bus 12 and connects with the processor 10 through an interrupt line 16 and a grant line 17. The scanner circuit 15 connects directly to the memory data bus 8, the memory address bus 5, the read/write lines 6 and the memory cycle line 7.

As will be described in more detail hereinafter, the scanner circuit 15 periodically couples the memory data bus 8 to an I/O data bus 18 which connects to one or more interface racks 19, each of which includes eight separately addressable slots. Each slot in turn includes sixteen addressable input or output circuits which connect through a cable 21 to the system being controlled. An I/O address bus 22 connects a rack adapter circuit 23 on each interface rack 19 to the scanner circuit 15, and each rack adapter circuit includes decoding circuitry which is responsive to three bits in the six-bit address code on the bus 22 to enable the interface rack 19 when its rack number is detected. Each rack adapter circuit 23 also includes decoding circuitry which enables one of the slots 0–7 in response to the three remaining bits on the I/O address bus 22.

The scanner circuit 15 reads a sixteen-bit word in the output image table 2 of the memory 1 and couples that word through the I/O data bus 18 to a selected rack and slot which is identified by a six-bit address on the I/O address bus 22. Also, the scanner circuit 15 periodically reads the status of sixteen input circuits in an addressed slot and couples the sixteen-bit data word to an addressed line in the input image table 3 of the memory 1. Thus, by periodically stealing a memory cycle from the processor 10, the scanner circuit 15 updates the input table 3 with the current status of the input devices connected to the controller interface racks 19, and periodically updates the state of the output devices on the controlled system by coupling the current status of the output image table 2 to the interface racks 19.

Figure 4B:
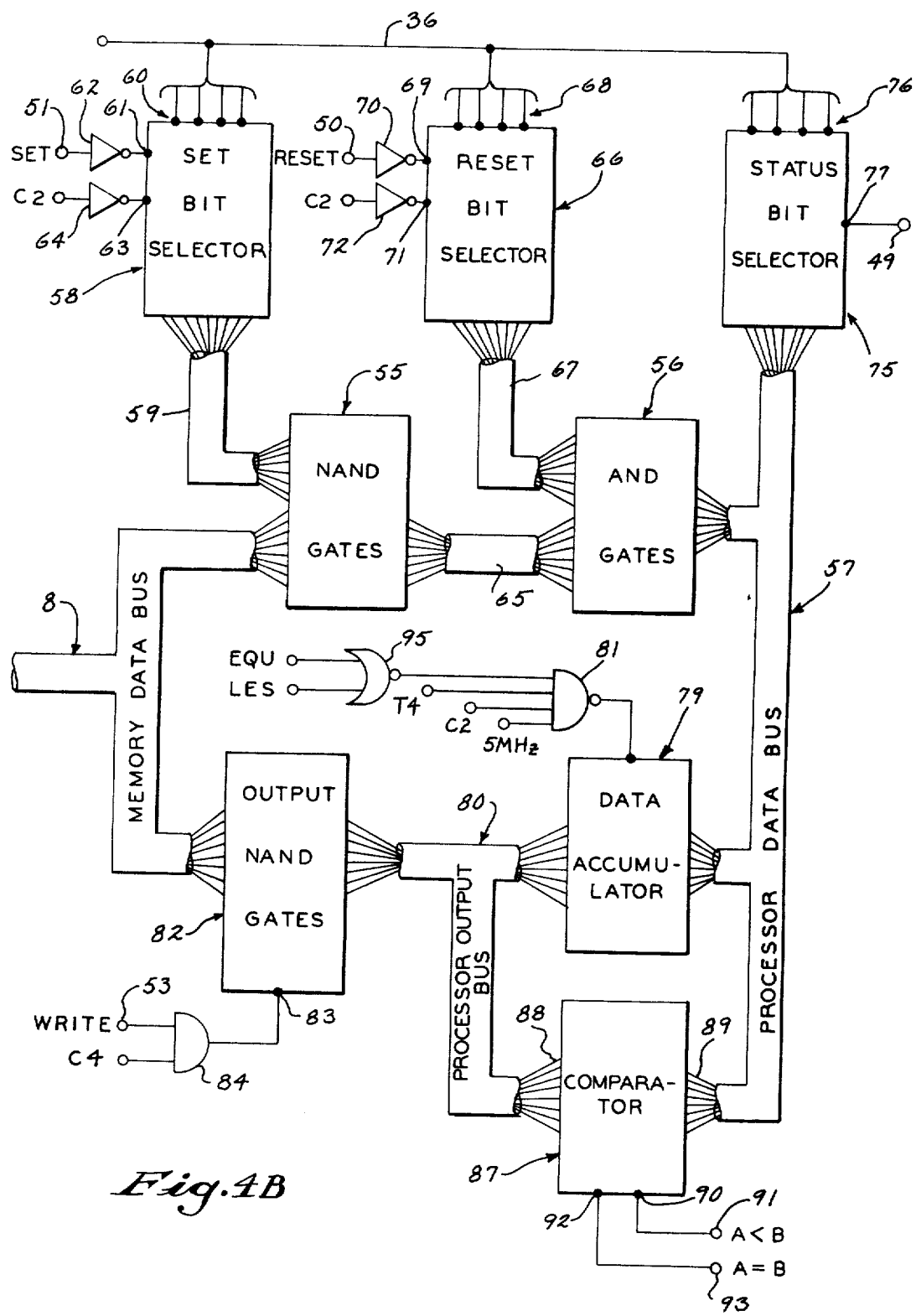

The processor 10 is constructed of commercially available high speed logic gates and integrated circuits. Referring to FIGS. 4A and 4B, the processor 10 includes a program instruction counter 26 which is coupled to the thirteen leads in the memory address bus 5 through a set of 13 instruction address gates indicated collectively at 27. Each instruction address gate 27 is a commercially available AND gate having its output terminal connected to one of the leads in the memory address bus 5, one of its input terminals connected to an output on the program instruction counter 26, and a second input terminal connected to a common enable terminal 28. When a logic high voltage is applied to the enable terminal 28, the 13-bit binary coded address appearing at the outputs of the program instruction counter 26 is applied to the memory address bus 5. The program instruction counter 26 is a 13-bit binary counter formed by cascade connecting 3 4-bit commercially available up/down counters with one commercially available flip-flop. The binary number generated by the program instruction counter 26 is increased by one count each time a logic high voltage pulse is applied to a clock terminal 29 and the generated address is reset to 400 (octal) each time a logic high voltage pulse is applied to a load terminal 30.

The program instruction counter 26 is rapidly incremented and the instruction address gates 27 are periodically enabled to sequentially read the program 4 out of the memory 1. The instruction address gates are periodically enabled by a C1 memory cycle pulse which is a logic high voltage of one microsecond duration. During the C1 memory cycle the addressed program instruction is read from the memory 1 and near the end of the C1 memory cycle a T3 timing pulse gates a logic high voltage through an AND gate 31 to the counter clock terminal 29. The program instruction counter is thus incremented one count and when the next C1 memory cycle is executed the next program instruction is read from the memory 1. The cycle continues until an end of program instruction is read from the memory 1 and decoded to generate an END operation signal to the load terminal 30. The program instruction counter 26 is then reset to the octal address four hundred and the control program is rescanned.

Each program instruction read from the memory 1 is received through the memory data bus 8 and stored in an instruction register 33. The instruction register 33 is comprised of 4 4-bit bistable latch circuits such as that manufactured by Texas Instruments, Inc., and identified as SN7475. The clock inputs on each latch circuit are commonly connected to a clock input terminal 34 on the instruction register 33, and when a logic high is applied to this terminal by an AND gate 35, the program instruction on the memory data bus 8 is stored. The AND gate 35 is enabled during each C1 memory cycle by a T2 timing pulse. As shown in Tables I, II and III above, each program instruction includes groups of bits which serve to indicate the operation to be performed by the processor, the address of a word in the image tables 2 or 3 and the identity of a status bit in the addressed word. The program instruction bits stored in the register 33 are generated at sixteen outputs, and bit numbers 10–13 are coupled to a pointer bus 36, bit numbers 10–17 are coupled through a set of eight leads 37 to an operation decoder 38, and bit numbers 0–7 are coupled through a set of leads 39 to a set of eight operand address gates indicated collectively at 40. The operand address gates 40 are commercially available AND gates each having one input connected to a lead 39 from the instruction register 33, and output connected to a lead in the memory address bus 5, and a second input commonly connected to an enable terminal 41.

The processor 10 is responsive to the operation code in each program instruction read from the memory 1 to perform a specified function, and depending upon the complexity of the function, anywhere from one to four one microsecond memory cycles are required to execute the program instruction. The operation code is decoded by the operation decoder 38 during the C1 memory cycle and a resulting operation signal is coupled to a memory cycle counter 45 through a decoder bus 46. In response to timing signals received from the polyphase clock 11 and an operation signal received from the operation decoder 38, the memory cycle counter 45 generates one microsecond memory cycle signals at a set of outputs C0, C1, C2, C3 and C4. The memory cycle counter 45 connects to the memory cycle control line 7, and at the commencement of each memory cycle signal C0, C1, C2, C3 or C4, the memory 1 is cycled by applying a logic high voltage pulse to the control line 7. The memory cycle counter 45 also connects to the interrupt line 16 and grant line 17, and in response to a logic high interrupt request on the line 16, it generates a logic high grant signal on the line 17. During such an interrupt it generates a C0 memory cycle signal, and relinquishes control of the memory cycle control line 7 to the requesting device.

Referring particularly to FIGS. 4A and 4B, the decoder bus 46 also connects to a logic unit 48 which is designed to perform Boolean functions in response to received operation signals. The logic unit 48 is also coupled to the polyphase clock 11 through the timing bus 12 and to the memory cycle outputs C0, C1, C2 and C4. As will be described in more detail hereinafter, the logic unit 48 operates the read/write memory control line 6 to examine the status of selected bits stored in the image tables 2 and 3 and to set or reset selected status bits in the output image table 2 as determined by the control program. For example, the condition, or logic state, of a selected status bit is examined with an XIC instruction, whereas a selected status bit in the output image table 2 is driven to a logic high state by an OTE instruction when conditions are true as determined by the logic unit 48. The logic state of an examined status bit is received by the logic unit 48 through a logic input line 49 during a C2 memory cycle, and when the state of a status bit is to be changed, the logic unit 48 generates a signal on a set line 51 or a reset line 50 during a C2 memory cycle.

Status words are read from the memory 1 by the processor 10 during each C2 memory cycle. The operand address gates 40 are enabled by the memory cycle counter 45 through an OR gate 52 and the read/write control line 6 is driven high by the logic unit 48. The addressed operand, or status word, is coupled through the memory data bus 8 to the processor 10 and is gated through a set of sixteen NAND gates 55 and sixteen AND gates 56 to a processor data bus 57. One input on each of the NAND gates 55 connects to a lead in the memory data bus 8 and a second input on each connects through a cable 59 to one of 16 output terminals on a set bit selector 58. The set bit selector 58 is a commercially available 4-line-to-16-line decoder such as SN54154 available from Texas Instruments, Inc. It has a set of 4 input terminals 60 which connect to the pointer bus 36, a first strobe terminal 61 which connects to the set bus 51 through an inverter gate 62, and a second strobe terminal 63 which connects to the C2 output on the memory cycle counter 45 through an inverter gate 64.

The set bit selector 58 either enables the NAND gates 55 to gate the status word received from the memory 1 to the bus 65 unchanged, or it changes a selected bit therein to a logic high state. When the set line 51 is at a logic low voltage, for example, all sixteen outputs of the set bit selector 58 are at a logic high voltage and the status word on the memory data bus 8 is gated through the NAND gates 55 without change. However, when the set bus 51 is at a logic high voltage, one of the sixteen outputs of the set bit selector 58 is driven to a logic low voltage during the C2 memory cycle. The status bit to be changed is indicated by the four-bit binary coded pointer on the bus 36 and the corresponding NAND gate 55 is disabled to generate a logic high voltage at its output terminal.

The 16 AND gates 56 are similarly connected, but operate to drive a selected bit in the status word to a logic low state. More specifically, one input on each AND gate 56 connects through the cable 65 to one of the NAND gate outputs and a second input on each AND gate 56 connects through a cable 67 to one of 16 output terminals on a reset bit selector 66. The reset bit selector 66 is identical to the set bit selector 58 and includes 4 inputs 68 which connect to the pointer bus 36, a first strobe terminal 69 which connects to the reset line 50 through an inverter gate 70, and a second strobe terminal 71 which connects to the C2 output of the memory cycle counter 45 through an inverter gate 72. When a logic high voltage is generated on the reset line 50, the status bit identified by the four-bit pointer at the inputs 68 is driven to a logic low voltage by the corresponding AND gate 56 during the C2 memory cycle. Otherwise, the sixteen-bit data word on the memory data bus 8 is coupled through the AND gates 56 to the processor data bus 57 without change.

When the condition of a status bit is examined with a program instruction such as XIO or XIC, the addressed status word is read from the input image table 3, is coupled through the NAND gates 55 and AND gates 56 without change to the processor bus 57 and is applied to sixteen input terminals on a status bit selector 75. The status bit selector 75 is a 16-line-to-1-line data selector such as SN74150 commercially available from Texas Instruments, Inc. It includes 4 data select terminals 76 which connect to the pointer bus 36 and an output terminal 77 which connects to the logic unit 48 through the logic output line 49. When a 16-bit status word is coupled to the processor data bus 57, the logic state of a status bit selected by the 4-bit binary coded pointer on the bus 36 is coupled to the logic input line 49. The entire examination operation is performed during a C2 memory cycle.

A status word on the processor data bus 57 may also be loaded into a sixteen-bit data accumulator 79. The data accumulator 79 is comprised of three cascade connected 4-bit up/down decade counters and four flip-flops which have their respective inputs connected to leads in the processor data bus 57 and their corresponding outputs connected to leads in a processor output bus 80. A load terminal on each counter and flip-flop is commonly connected to the output of a load NAND gate 81 which is enabled by a T4 timing pulse during a C2 memory cycle. When enabled, the NAND gate 81 generates a logic low voltage to the data accumulator 79 and the status word on the processor data bus 57 is stored. The processor output bus 80 is coupled to the memory data bus 8 by a set of 16 output NAND gates 82. Each NAND gate 82 has an input commonly connected to an enable terminal 83, and the enable terminal 83 is coupled to a write line 53 by an AND gate 84. The C4 output of the memory cycle counter 45 also connects to the AND gate 84 and when the data word stored in the data accumulator 79 is to be loaded into the memory 1 as determined by the logic unit 48, a logic high voltage is generated on the write line 53 during the C4 memory cycle.

The processor data bus 57 and the processor output bus 80 also connect to a twelve-bit comparator 87. The comparator 87 is comprised of three cascade connected four-bit magnitude comparators such as SN7485 commercially available from Texas Instruments, Inc. Twelve A inputs 88 on the comparator 87 connect to receive the octal bits 0–7 and 10–13 stored in the data accumulator 79, and 12 B inputs 89 connect to receive the corresponding bits generated on the processor data bus 57. When the magnitude of a data word stored in the data accumulator 79 is less than the magnitude of a data word on the processor data bus 57, a logic high voltage is generated at a comparator output terminal 90 and applied through a lead 91 to the logic unit 48. On the other hand, when the magnitude of the two data words are equal, a logic high voltage is generated at a comparator output terminal 92 and coupled to the logic unit 48 through a lead 93.

The comparison operations (EQU or LES) are performed on data words read from the memory 1. The first data word is read out of the memory 1 by a GET instruction and is stored in the data accumulator 79. The comparison instruction (EQU or LES) is then executed and a second data word is read out of the memory 1 and coupled to the processor bus 57. A NOR gate 95 is connected to the load NAND gate 81 and receives the EQU and LES operation signals to inhibit the NAND gate 81. The data word previously stored in the data accumulator 79 is thus retained during the C2 memory cycle, and a comparison is made between its magnitude and that on the processor data bus 57 during the T4 timing pulse.

Figure 5:
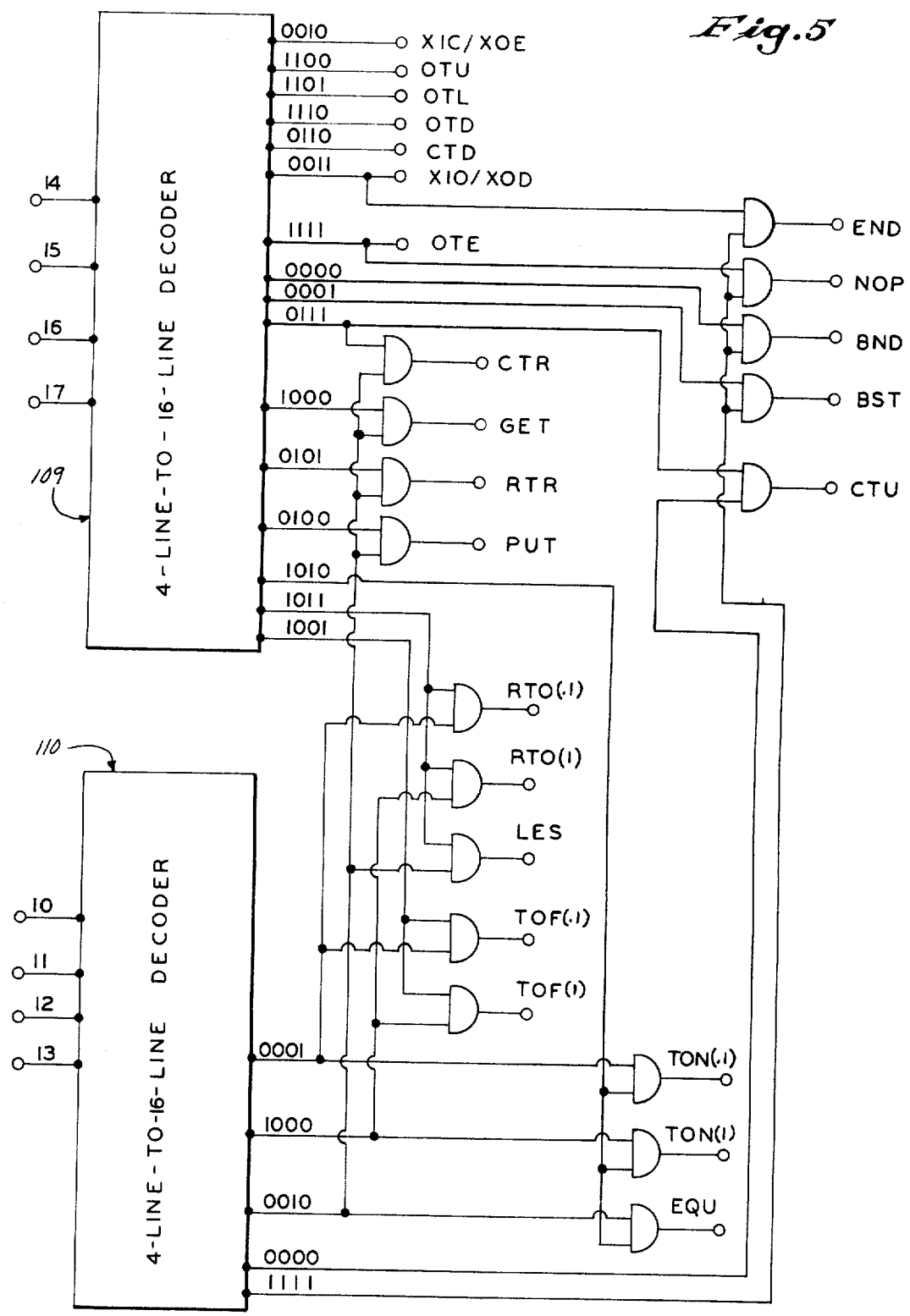
FIG. 5 is an electrical schematic diagram of an operation decoder which forms part of the processor of FIG. 4.

Referring to FIG. 5, the operation decoder 38 decodes the operation code in each program instruction stored in the instruction register 33. It includes a 4-line-to-16-line decoder circuit 109 which connects to receive bit numbers 14–17 and a 4-line-to-16-line decoder circuit 110 which connects to receive bit numbers 10–13 in each program instruction. The decoder circuits 109 and 110 are commercially available integrated circuits SN74154 available from Texas Instruments, Inc. The bit patterns for each operation code are listed in tables I–III, and when one of these bit patterns is applied to the decoders 109 and 110, a logic high operation signal is generated on a lead of the decoder bus 46. Each lead in the decoder bus 46 is identified hereinafter with the mnemonic designation of the operation signal which is generated on it. Many variations in the decoder circuit are possible in view of the many circuits which are available for decoding an eight-bit binary signal.

Figure 6:
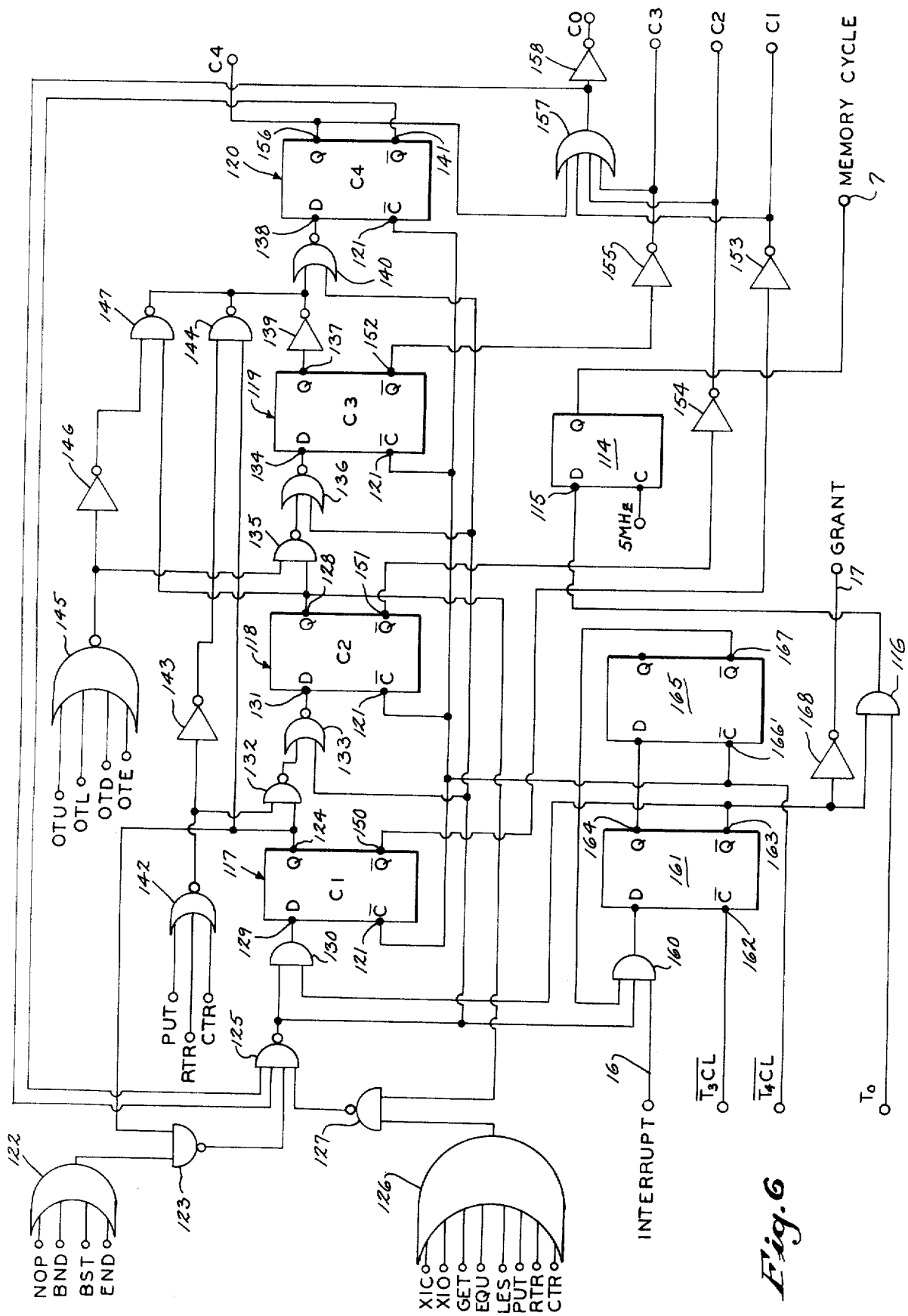
FIG. 6 is an electrical schematic diagram of a phase counter which forms part of the processor in FIG. 4.

Referring particularly to FIG. 6, the memory cycle counter 45 initiates each one microsecond memory cycle by periodically generating a logic high voltage pulse on the memory cycle control line 7. It also determines the number of memory cycles which are required to execute each program instruction read from the memory 1 and generates signals to coordinate the operation of the processor elements. The memory cycle counter 45 includes a D-type flip-flop 114 which has a clock terminal connected to the five megahertz clock lead in the timing bus 12 and a D input terminal 115 connected to receive the T0 timing pulse through an interrupt AND gate 116. The Q output on the flip-flop 114 connects to the memory cycle control line 7 and is driven to a logic high voltage for 200 nanoseconds in synchronism with the timing signal T0. When an interrupt is granted as will be described in more detail hereinafter, the interrupt AND gate 116 disables the flip-flop 114 and control of the memory cycle line 7 is relinquished to the scanner circuit 15.

The memory cycle counter 45 also includes a set of 4 D-type flip-flops 117–120 which are cascade connected to form a 4-bit ring counter. The flip-flops 117–120 are identified hereinafter as C1–C4 respectively and each includes a clock terminal 121 which is connected to receive the timing signal $\overline{T4.CL}$ from the timing bus 12. A logic high "one" is circulated among the flip-flops 117–120 in response to the timing pulses and the path of the one is determined by the operation signal received from the operation decoder 38. The NOP, BND, BST and END operation signals are received at an OR gate 122 and are applied to one input of a NAND gate 123. The other input on the NAND gate 123 is connected to a Q output terminal 124 on the C1 flip-flop 117 and its output terminal connects to one input on an input NAND gate 125. The operation signals XIC, XIO, GET, EQU, LES, PUT, RTR and CTR are received at a second OR gate 126 and applied to one input of a NAND gate 127. A second input terminal on the NAND gate 127 connects to a Q output terminal 128 on the C2 flip-flop 118 and its output terminal connects to an input terminal on the input NAND gate 125. The input NAND gate 125 is coupled to a D input 129 on the C1 flip-flop 117 through an interrupt AND gate 130. The Q terminal 124 on C1 flip-flop 117 is coupled to a D input terminal 131 on the C2 flip-flop 118 through a NAND gate 132 and a NOR gate 133. The Q output terminal 128 on C2 flip-flop 118 is coupled to a D input 134 on C3 flip-flop 119 through a NAND gate 135 and a NOR gate 136, and the Q output terminal 137 on C3 flip-flop 119 couples to a D input terminal 138 on the C4 flip-flop 120 through an inverter gate 139 and a NOR gate 140. A second input on each of the NOR gates 133, 136 and 140 connects to the output of the input NAND gate 125, and the $\overline{Q}$ output terminal 141 on C4 flip-flop 120 connects to a third input on the input NAND gate 125. The operation signals PUT, RTR and CTR are applied to an input NOR gate 142 which is connected to a second input on the NAND gate 132 and through an inverter gate 143 to the input of a NAND gate 144. A second input on the NAND gate 144 connects to the Q output terminal 124 on the C1 flip-flop 117 and its output terminal connects to the NOR gate 140. The operation signals OTU, OTL, OTD and OTE are applied to a second input NOR gate 145 which connects to a second input terminal on the NAND gate 135 and connects through an inverter gate 146 to one input terminal on a NAND gate 147. A second input on the NAND gate 147 connects to the Q output terminal 128 on C2 flip-flop 118 and its output connects to the NOR gate 140.

The $\overline{Q}$ output terminals 150, 151 and 152 on the respective flip-flops 117, 118 and 119 connect through respective inverter gates 153, 154 and 155 to the memory cycle counter outputs C1, C2 and C3. The Q output terminal 156 on C4 flip-flop 120 connects to the C4 output terminal and to one input of an output OR gate 157. The outputs of each inverter gate 153, 154 and 155 also connects to an input on the output OR gate 157 and the OR gate output terminal connects through an inverter gate 158 to the C0 output terminal. The output of the OR gate 157 also connects to an input terminal on the input NAND gate 125.

The memory cycle counter 45 functions in response to an applied operation signal to selectively cycle a logic high one through selected flip-flops 117–120 and to thereby generate a sequence of one microsecond logic high voltage pulses at the outputs C0–C4. When the OR gate 122 is enabled by one of the applied operation signals NOP, BND, BST or END, the one at the Q output of the C1 flip-flop 117 is coupled through the gates 123, 125 and 130 and clocked back into the C1 flip-flop 117 during the $\overline{T4.CL}$ timing pulse. A single C1 memory cycle is thus executed when a NOP, BND, BST or END instruction is read from the memory 1.

If the input OR gate 126 is enabled by one of the indicated operation signals, the logic high one at the Q output terminal 124 of C1 flip-flop 117 is coupled through the gates 132 and 133 at the end of the C1 memory cycle and is clocked into the C2 flip-flop 118 by the $\overline{T4.CL}$ timing pulse. A C2 memory cycle is then executed. At the termination of the C2 memory cycle, the logic high count at Q output terminal 128 is gated back into the C1 flip-flop 117 through the gates 125 and 130. In other words, the operations XIC, XIO, GET, EQU, and LES are executed in two memory cycles C1 and C2.

When a PUT, RTR or CTR instruction is read from the memory 1, the NOR gate 142 is enabled and at the completion of the C1 memory cycle, the logic high one at the Q output terminal 124 of C1 flip-flop 117 is gated through the NAND gate 144 and NOR gate 140 and clocked into the C4 flip-flop 120. As a result, these instructions are executed with a C1 followed by a C4 memory cycle. At the completion of the C4 memory cycle the one is coupled back into the C1 flip-flop 117 through the input NAND gate 125 and the AND gate 130.

When the NOR gate 145 is enabled by one of the operation signals OTU, OTL, OTD or OTE, the C1 and C2 memory cycles are executed and at the completion of the C2 memory cycle the one is gated through the NAND gate 147 and NOR gate 140 to the C4 flip-flop 120. As a result, these instructions are executed with three memory cycles, C1, C2 and C4. Finally, when a TOF, TON, RTO, CTD or CTU instruction is read from the memory 1, the memory cycle counter 45 cycles the memory 1 4 times and in doing so, advances the one sequentially through the C1, C2, C3 and C4 flip-flops 117–120.

When an interrupt is requested by the scanner circuit 15, a logic high voltage is generated on the interrupt line 16 and the memory cycle counter 45 deviates from its cyclic pattern and generates a one microsecond logic high voltage at the C0 output. More specifically, the interrupt line 16 connects to an input terminal on an AND gate 160 which has a second input connected to the output of the AND gate 125 and an output connected to the D input of an interrupt flip-flop 161. The flip-flop 161 is a conventional D-type flip-flop which has a clock terminal 162 that connects with the timing bus 12 to receive the $\overline{T3CL}$ timing pulse. A $\overline{Q}$ output terminal 163 on the interrupt flip-flop 161 connects to a second input terminal on the interrupt AND gate 130, and a Q output terminal 164 connects to the input of an interrupt inhibit flip-flop 165. A clock terminal 166 on the flip-flop 165 connects to the timing bus 12 to receive the $\overline{T4CL}$ timing pulse, and a $\overline{Q}$ output terminal 167 connects to a third input terminal on the AND gate 160. The $\overline{Q}$ output terminal 163 on the interrupt flip-flop 161 also connects through an inverter gate 168 to the grant line 17 and to a second input terminal on the interrupt AND gate 116.

When an interrupt is requested by the scanner circuit 15, the instruction then being executed by the processor 10 is completed before the interrupt is granted. At the completion, the logic high one in the memory cycle counter 45 is fed back from one of the flip-flops 117, 118, or 120, but before being clocked into the C1 flip-flop 117 the logic high interrupt is gated into the interrupt flip-flop 161 by the $\overline{T3.CL}$ timing pulse, and the resulting logic low voltage generated at its $\overline{Q}$ output terminal 163 disables the AND gate 130. The logic low generated at the $\overline{Q}$ output terminal 163 is also coupled through the inverter gate 168 to generate a logic high grant signal on the line 17 and to disable the interrupt AND gate 116. The interrupt is thus granted to the scanner circuit 15 and the memory cycle control line 7 is relinquished for one microsecond. During the interrupt, the C1, C2, C3 and C4 flip-flops 117–120 are all reset and a logic low voltage is inverted to a logic high C0 memory cycle signal by the inverter gate 158.

The C0 memory cycle terminates when the interrupt flip-flop 161 is reset by the $\overline{T3.CL}$ timing pulse and a logic high at the output of the NAND gate 125 is clocked into the C1 flip-flop 117 by the $\overline{T4.CL}$ timing pulse. Although the interrupt line 16 is typically driven to a logic low voltage immediately after each interrupt is granted, it is possible for a second interrupt to be requested during the C0 memory cycle. If this should occur, a second, consecutive C0 interrupt memory cycle would be executed if it were not for the interrupt inhibit flip-flop 165. The flip-flop 165 is set by the first interrupt and the logic low generated at its $\overline{Q}$ output terminal 167 disables the AND gate 160 despite the presence of a second interrupt request. Thus, only one memory cycle is stolen by an interrupt and the control program will continue to execute at least one more instruction before granting another interrupt. Thus the execution of the control program cannot be stalled by continuous interrupt requests.

Figure 7:
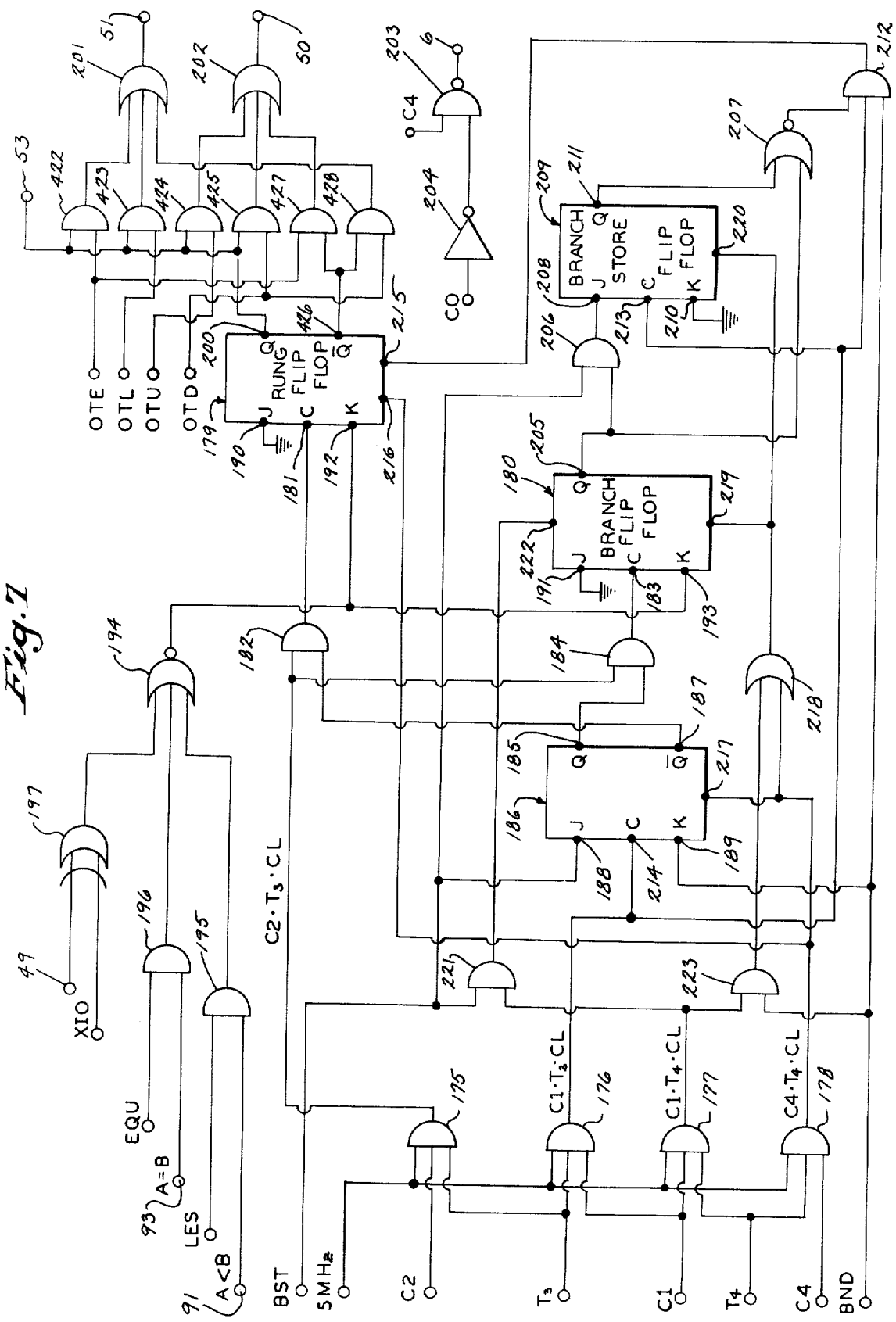
FIG. 7 is an electrical schematic diagram of a logic unit which forms part of the processor in FIG. 4.

The logical decisions necessary to determine if selected status bits in the output image table 2 of the memory 1 are to be set to a logic one or reset to a logic zero state are made in the logic unit 48 of the processor 10. Although it has additional capabilities, the logic unit 48 herein is similar in function to the central logic unit of the programmable matrix controller described in the above cited U.S. Pat. No. 3,810,118. Referring particularly to FIG. 7, the logic unit 48 includes a set of 4 timing AND gates 175-178 which connect to the timing bus 12 and the memory cycle counter outputs C1, C2 and C4. The AND gates 175–178 generate respective timing pulses C2.T3.CL, C1.T3.CL, C1.T4.CL and C4.T4.CL at their output terminals. The basic decision making function of the logic unit is performed by a rung flip-flop 179 and a branch flip-flop 180. The flip-flops 179 and 180 are commercially available J-K flip-flops. The timing pulse C2.T3.CL is coupled to a clock terminal 181 on the rung flip-flop 179 through an AND gate 182, and the same timing pulse is coupled to a clock terminal 183 on the branch flip-flop 180 through an AND gate 184. A Q output terminal 185 on a flip-flop 186 connects to an input terminal on the AND gate 184, and its $\overline{Q}$ output terminal 187 connects to an input terminal on the AND gate 182. A J terminal 188 on the flip-flop 186 connects to receive the BST (branch start) operation signal and K terminal 189 connects to receive the BND (branch end) operation signal.

The J terminals 190 and 191 on the respective flip-flops 179 and 180 are connected to circuit ground and their K terminals 192 and 193 connect to the output of an input NOR gate 194. A first AND gate 195 connects to the comparator circuit lead 91 and its output connects to the input NOR gate 194. When enabled by a LES operation signal, the logic signal on the lead 91 is coupled to the NOR gate 194. A second AND gate 196 is similarly connected to couple the comparator circuit lead 93 to the NOR gate 194 when enabled by an EQU operation signal. The logic input line 49 is also coupled to the input NOR gate 194 by an exclusive OR gate 197 to invert the logic state of the input line 49 when an XIO instructon is executed.

A Q output terminal 200 on the rung flip-flop 179 connects to the write line 53 and connects to one input on each of four output AND gates 422–425. A second input terminal on each of the respective output AND gates 422–425 connects to receive the operation signals OTE, OTL, OTU and OTD, and the output terminals of AND gates 422 and 423 connect to inputs on a set OR gate 201 and the output terminals of AND gates 424 and 425 connect to inputs on a reset OR gate 202. A $\overline{Q}$ output terminal 426 on the rung flip-flop connects to one input on each of two additional output AND gates 427 and 428. A second input terminal on each of the AND gates 427 and 428 connects to receive the respective operation signals OTE and OTD and their respective output terminals connect to the reset OR gate 202 and set OR gate 201. If the rung flip-flop 179 is in a set state its Q output 200 is at a logic high voltage and when an OTE or an OTL operation signal is present, a logic high voltage is generated on the set line 51 to set the state of a selected status bit to a logic high, or logic 1. On the other hand, if the OTU or OTD operation signal is present, a logic high is generated on the reset line 50 and the selected status bit is reset to a logic low, or logic 0. When the rung flip-flop 179 is in its reset state, a logic high voltage is generated at its $\overline{Q}$ output terminal 426 to enable the output AND gates 427 and 428. As a result, when the OTE operation signal is present the selected status bit is reset and when the OTD operation signal is present the selected status bit is set.

A NAND gate 203 has one input connected to the CO output of the memory cycle counter 45 through an inverter gate 204, a second input connected to the C4 output of the memory cycle counter 45 and an output terminal which connects to the read/write memory control line 6. When an OTE, OTD, OTL or OTU program instruction is executed, the selected bit in the addressed status word is driven to the indicated logic state and during the C4 memory cycle, the read/write memory control line 6 is driven low to rewrite the addressed status word back into the output image table 2 of the memory 1.

A Q output terminal 205 on the branch flip-flop 180 connects to one input of an AND gate 206 and to one input of a NOR gate 207. A second input on the AND gate 206 connects to receive the BST operation signal and its outer terminal connects to a J input 208 on a branch store flip-flop 209. A K input 210 on the flip-flop 209 connects to circuit ground and its Q output connects to a second input on the NOR gate 207. The output of the NOR gate 207 connects to one input on an AND gate 212 and a second input on the AND gate 212 connects to receive the BND operation signal. A third input on the AND gate 212 along with a clock terminal 213 on the branch store flip-flop 209 and a clock terminal 214 on the flip-flop 186 connect to receive the C1.T3.CL timing pulse from the AND gate 176. The output of the AND gate 212 connects to a clear terminal 215 on the rung flip-flop 179 which resets the flip-flop 179 when a logic high voltage is applied. The timing pulse C4.T4.CL generated at the output of the AND gate 178 is coupled directly to a preset terminal 216 on the rung flip-flop 179 and a clear terminal 217 on the flip-flop 186. The timing pulse is also coupled through an OR gate 218 to a clear terminal 219 on the branch flip-flop 180 and to a clear terminal 220 on the branch store flip-flop 209. The timing pulse C1.T4.CL at the output of the timing AND gate 177 is coupled through a branch start AND gate 221 to a preset terminal 222 on the branch flip-flop 180 and through a branch end AND gate 223 to a second input on the OR gate 218. A second input on the branch start AND gate 221 connects to receive the BST operation signal and a second input on the branch end AND gate 223 connects to receive the BND operation signal.

Figure 12:
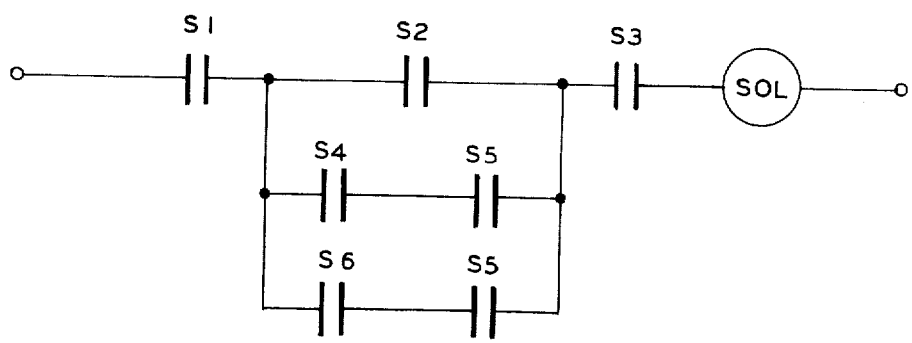
FIG. 12 is an example ladder diagram.

The operation of the logic unit 48 is explained best with the aid of the ladder diagram in FIG. 12. The ladder diagram indicates that a solenoid SOL on the system being controlled by the programmable controller is to be energized when a conductive path is formed by the switches S1-S6. The following is a control program for making this determination and operating the solenoid accordingly.

XIC S1

BST

XIC S2

BST

XIC S4

XIC S5

BST

XIC S6

XIC S5

BND

XIC S3

OTE SOL

At the beginning of the above control program, the Q output terminal 200 on the rung flip-flop 179 is at a logic high voltage state and the Q outputs 185, 205 and 211 on the respective flip-flops 186, 180 and 209 are at a logic low voltage state. In the example it will be assumed that the switches S1, S6, S5 and S3 have throughput at the time the program is scanned by the processor 10, and that the solenoid should therefore be energized. The XIC S1 program instruction is executed by a C1 memory cycle and a C2 memory cycle. During the C1 memory cycle the instruction is read from the memory 1, the operation code decoded and the memory cycle counter 45 conditioned to perform a C2 memory cycle. During the C2 memory cycle, the status word in the image input table 3 which contains the status bit corresponding to S1 is read out of the memory 1 and the logic state of S1 is coupled through the exclusive OR gate 197 and NOR gate 194 to the K terminal 192 of the rung flip-flop 179. The status bit indicates that the switch S1 is closed and a logic low voltage is, therefore, applied to the K terminal 192 when the flip-flop 179 is clocked by the timing pulse C2.T3.Cl. The Q output terminal 200 therefore remains at a logic high voltage. The BST program instruction is executed next and requires a single C1 memory cycle. It is read from the memory 1 and decoded to generate a BST operation signal which is applied to the J terminal 188 on the flip-flop 186 and is coupled through the branch AND gate 221 to the preset terminal 222 on the branch flip-flop 180. As a result, during the timing pulse C1.T3.CL flip-flop 186 is set to generate a logic high voltage at its Q output terminal 185 and during the timing pulse C1.T4.CL the branch flip-flop 180 is set to generate a logic high voltage at its Q output terminal 205. The branch flip-flop 180 is now conditioned to receive the logic state of the status bit from the logic input line 49.

The XIC S2 instruction which follows is executed in two memory cycles much like the XIC S1 instruction. However, the status bit which corresponds to S2 is at a logic low voltage state and when the branch flip-flop 180 is clocked by the C2.T3.CL timing pulse a logic high voltage is applied to its K terminal 193. The branch flip-flop 180 is thus reset and a logic low voltage appears at its Q terminal 205. The BST instruction which follows transfers the result stored in the branch flip-flop 180 to the branch store flip-flop 209. More specifically, the BST operation signal gates the logic state of Q terminal 205 to the J input 208 on the branch store flip-flop 209 and the C1.T3.CL timing pulse clocks the flip-flop 209. Because the first branch containing S2 was false, a logic low is applied to the J terminal 208 and the Q output 211 remains at a logic low voltage. The BST operation signal also gates the C1.T4.CL timing pulse to the preset terminal 222 on the branch flip-flop to set its output to a logic high voltage in preparation for testing the conductivity of the next branch.

The XIC S4 and XIC S5 program instructions which follow are each executed in two memory cycles in the manner described above. The logic state of the status bits corresponding to the switches S4 and S5 are each clocked into the branch flip-flop 180 by the timing pulse C2.T3.Cl. The S4 status bit is at a logic low voltage indicating that the conductive branch is open and the branch flip-flop 180 is, therefore, in its rest condition after the XIC S5 instruction is completely executed. The next BST instruction does not alter the state of the branch store flip-flop 209 when the timing pulse C1.T3.CL is applied to its clock terminal 213. The state of its Q output 211 remains unchanged from its logic low voltage state.

The next conductive branch is formed by the switches S6 and S5 which are examined by executing the XIC S6 instruction and the XIC S instruction. The status bits at the output of EXOR gate 197 are at a logic high voltage and a logic low is thus applied to the K terminal 193 on the branch flip-flop 180 during each timing pulse C2.T3.CL. The branch flip-flop 180 thus remains set throughout the execution of these program instructions and its Q output terminal 205 is at a logic high voltage state. The BND instruction is then executed in a single C1 memory cycle. The BND operation signal enables the AND gate 212 and the timing pulse C1.T3.CL gates the logic state at the output of the NOR gate 207 to the clear terminal 215 on the rung flip-flop 179. Because the Q output 205 on the branch flip-flop 180 is at a logic high voltage, a conductive branch is indicated and a logic low is applied to the rung flip-flop 179. The Q outpt 200 on the rung flip-flop 179 is not changed and it remains at a logic high voltage to indicate that a conductive branch is thus far established. It should be aparent, however, that if no conductive branch was found among the switches S2, S4, S5 and S6, both flip-flops 180 and 209 would be in a reset condition during the BND operation and a logic high voltage would be applied to the clear terminal 215. The rung flip-flop would thus be reset to indicate that conditions were not true. The BND operation is completed when the timing pulse C1.T4.CL resets the Q outputs 185, 205 and 211 on the flip-flops 186, 180 and 209 to a logic low voltage state.

The final examination instruction, XIC S3, is then executed and found to be true. The logic high status bit S3 is received through the logic input line 49, passed by EXOR 197 and inverted by the NOR gate 194 and applied to the K input terminal 192 on the rung flip-flop 179. When clocked by the timing pulse C2.T3.CL, therefore, the rung flip-flop 179 does not change state. Consequently, when the OTE instruction is now executed, the Q output terminal 200 is in a logic high, or true, state which indicates that the conditions have been met to energize the solenoid SOL.

The OTE SOL instruction is executed with three memory cycles (C1, C2 and C4). During the C1 memory cycle the OTE SOL program instruction is read from the memory 1 and decoded by the operation decoder 38. During the C2 memory cycle the word in the output image table 2 which contains the status bit corresponding to the solenoid SOL is read from the memory 1 and is set to a logic high voltage state by the set bit selector 58 and NAND gates 55 as hereinabove described. During the C4 memory cycle the status word is written back into the memory 1 as described above, and the logic unit 48 is placed in condition to process the next program instruction. More specifically, during the timing pulse C4.T4.CL the rung flip-flop 179 is set by the logic high applied to its preset terminal 216. The branch decision flip-flop 186, branch flip-flop 180 and branch store flip-flop 209 are reset by the logic high applied to their clear terminals 217, 219 and 220 during the C4.T4.CL timing pulse.

Figure 8:
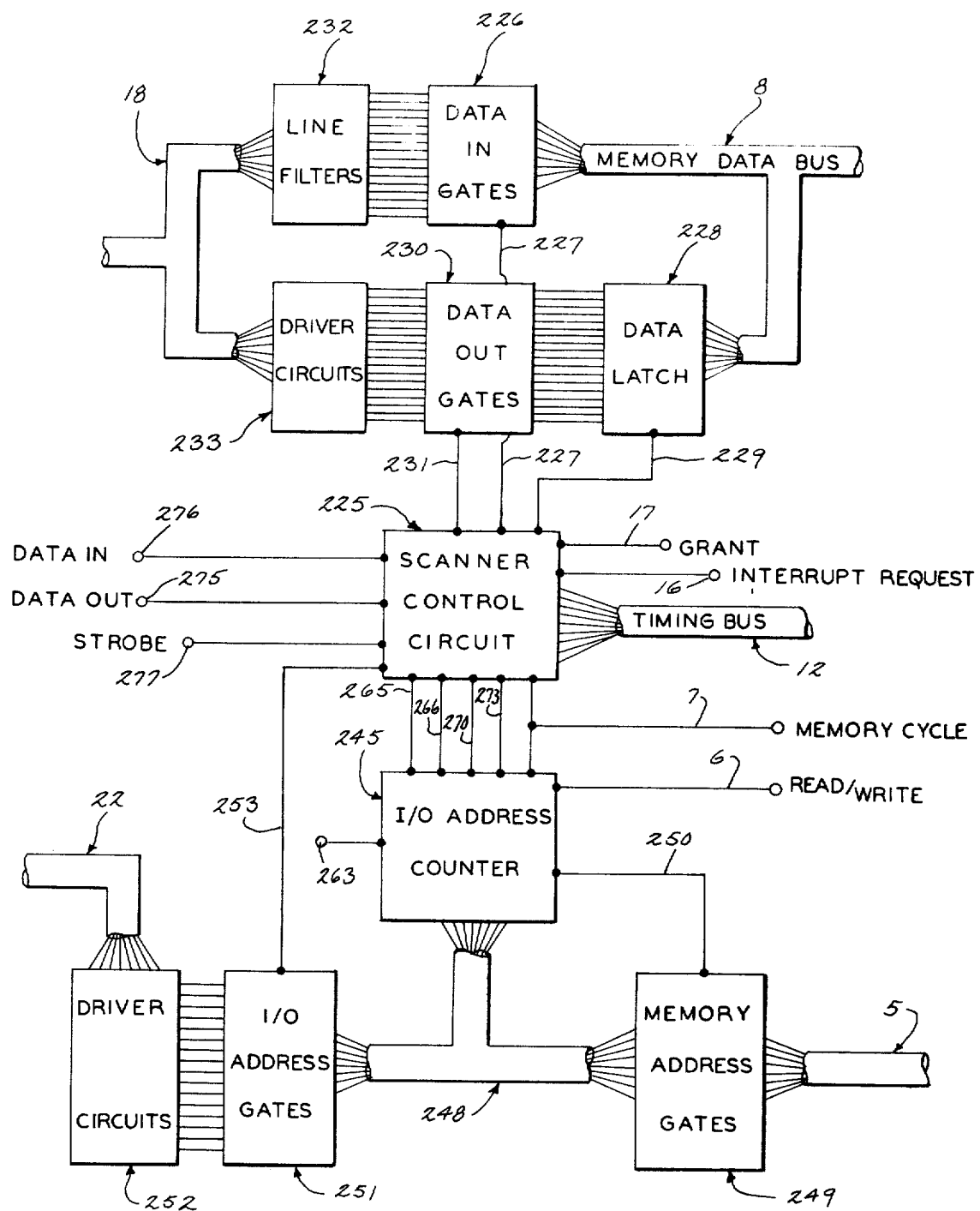
FIG. 8 is a block diagram of an input/output scanner circuit which forms part of the programmable controller in FIG. 1.

Referring to FIGS. 1 and 8, the scanner circuit 15 couples status data between the interface racks 19 and the memory 1 by periodically stealing a CO memory cycle from the processor 10. The scanner circuit 15 incudes a scanner control circuit 225 which connects to the timing bus 12 to coordinate the operation of the scanner circuit 15. The scanner control circuit 225 also connects to the memory cycle control line 7 to initiate a CO memory cycle when an interrupt is granted. During each one microsecond CO memory cycle a sixteen-bit status word is either coupled from the I/O data bus 18 to the memory data bus 8 and written into an addressed line of the memory 1, or a 16-bit status word is read out of the memory 1 onto the memory data bus 8 and coupled to the I/O data bus 18. These functions are controlled by the scanner control circuit 225 which connects to a set of 16 data input NAND gates 226 through an enable line 227, which connects to a 16-bit data latch 228 through a data latch control line 229, and which connects to a set of 16 data out gates 230 through an enable line 231.

The data in gates 226 are NAND gates, each of which has an input commonly connected to the enable line 227 and an output connected to a lead in the memory data bus 8. A second input on each of the gates 226 connects to an output on one of 16 line filters 232. The line filters 232 will be described in more detail hereinafter, and each has a 6-microsecond rise time to the threshold voltage of the NAND gates 226. An input on each of the line filters 232 connects to a lead in the I/O data bus 18. When enabled by a logic high voltage on the enable line 227, the 16-bit status word on the I/O data bus 18 is coupled through the line filters 232 and gated onto the memory data bus 8.

Figure 13:
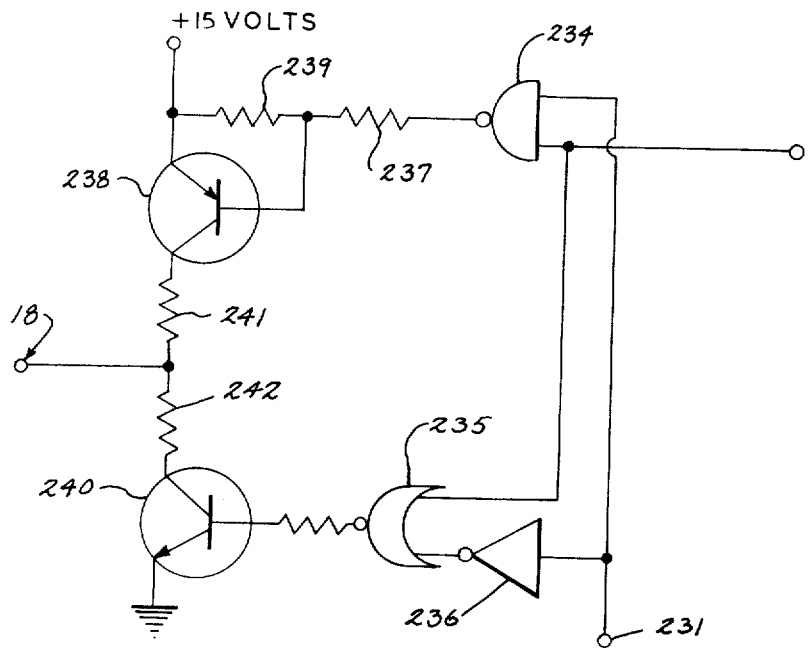
FIG. 13 is an electrical circuit diagram of a gate circuit and associated driver circuit which forms part of the input/output circuit of FIG. 8, FIGS. 14A and 14B are timing diagrams for the input/output scanner circuit of FIG. 8.

The data latch 228 is comprised of four four-bit bistable latch circuits such as SN7475 available from Texas Instruments, Inc. The clock terminal on each latch circuit is commonly connected to the data latch control line 229, the D terminals are each connected to a lead in the memory data bus 8, and the 16 Q terminals connect to the data out gates 230. Referring particularly to FIGS. 8 and 13, the data out gates 230 are each associated with a driver circuit 233 which converts the 5-volt logic level used in the processor 10 and memory 1 to a 15-volt level. More specifically, each lead from the data latch 228 connects to an input of a NAND gate 234 and an input of a NOR gate 235. A second input on the NAND gate 234 connects to the data out enable line 231 and through an inverter gate 236 to a second input on the NOR gate 235. The output of the NAND gate 234 connects through a coupling resistor 237 to the base of a PNP transistor 238. A positive 15-volt supply is connected to the emitter of the PNP transistor 238 and coupled through a bias resistor 239 to its base. The output of the NOR gate 235 connects through a resistor to the base of an NPN transistor 240 and the emitter of the transistor 240 connects to signal ground. The collectors on each transistor 238 and 240 connect through load resistors 241 and 242 to a lead in the I/O data bus 18. When enabled by a logic high voltage applied to the data out enable line 231, the 16-bit status word stored in the data latch 228 is coupled to the I/O data bus 18.

Figure 9:
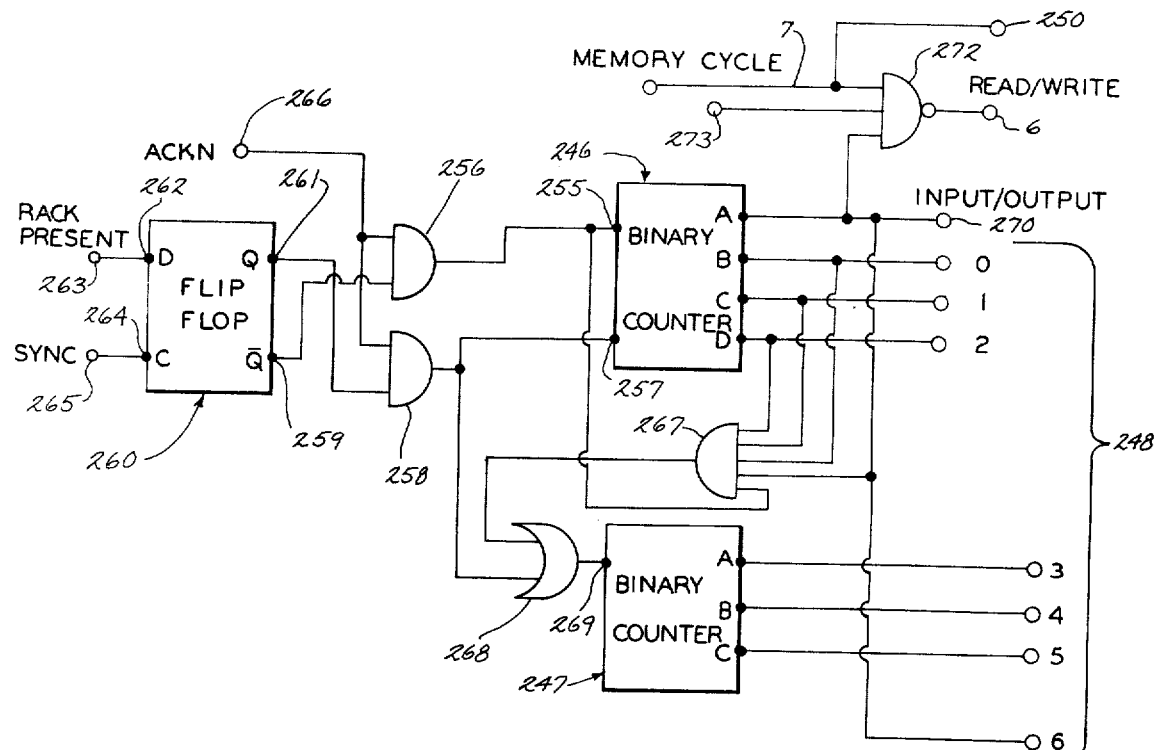
FIG. 9 is an electrical schematic diagram of an I/O address counter which forms part of the scanner circuit of FIG. 8, FIGS. 10A and 10B are an electrical schematic diagram of the I/O scanner control circuit which forms part of the input/output scanner circuit of FIG. 8.

The scanner control circuit 225 operates to alternately couple data into an addressed line of the memory 1 from an addressed I/O slot and couple data from an addressed line in the memory 1 to an addressed I/O slot. Each of these operations requires a CO memory cycle which is obtained by an interrupt request on the line 16. The address of the line in the memory 1 and the address of the I/O slot is generated by an I/O address counter 245. Referring particularly to FIGS. 8 and 9, the I/O address counter 245 includes a pair of 4-bit binary counters 246 and 247 which generate a seven-bit address code on a scanner address bus 248. The scanner address bus 248 connects to a set of 7 memory address gates 249 which have their output terminals connected to the 7 least significant digit leads in the memory address bus 5. The memory address gates 249 are AND gates each having an input terminal connected to one of the 7 leads in the scanner address bus 248 and each having a second input terminal which connects through an I/O memory cycle line 250 to the I/O address counter 245. When an interrupt is granted, the I/O memory cycle line 250 is driven to a logic high voltage during the CO memory cycle and the seven-bit address generated by the I/O address counter 245 is gated onto the memory address bus 5 by the memory address gates 249.

The scanner address bus 248 is also connected to a set of 6 I/O address gates 251. The outputs of the gates 251 in turn are coupled through a set of 6 driver circuits 252 to the I/O address buss 22. Each i/O address gate 251 and associated drive circuit 252 is identical to the data out gate 230 and associated driver circuit 233 shown in FIG. 13 and described above. The I/O address gates 251 gate the address on the scanner address bus 248 to the I/O address bus 22 when a logic high voltage is applied to an enable line 253 which connects to the scanner control circuit 225.

The binary counter 246 in the I/O address counter 245 includes a clock terminal 255 which connects to the output of a first AND gate 256. It also includes a reset terminal 257 which connects to the output of a second AND gate 258. One input on the first AND gate 256 connects to a $\overline{Q}$ output 259 on a D-type flip-flop 260 and a second input on the AND gate 258 connects to a Q output 261 on the flip-flp 260. A D input 262 connects to a rack present line 263 and a clock input 264 connects to a sync line 265. A second input on each of the AND gates 256 and 258 connects to an acknowledge line 266. The four outputs A-D on the binary counter 246 connect to four inputs on a coupling AND gate 267 and the output of the AND gate 267 connects through an OR gate 268 to a clock terminal 269 on the binary counter 247. The output of the first AND gate 256 also connects to an input on the coupling AND gate 267 and the output of the second AND gate 258 connects to a second input on the OR gate 268. The three output terminals A, B and C on the binary counter 247 connect to lead numbers 3, 4 and 5 in the scanner address bus 248 and they generate a three-bit rack address code. The output terminals B, C and D on the binary counter 246 connect to lead numbers 0, 1 and 2 in the scanner address bus 248 and they generate a three-bit slot address code. The output terminal A on the binary counter 246 connects to an input/output line 270, connects to lead number 6 in the scanner address bus 248, and connects to one input of a NAND gate 272. A second input on the NAND gate 272 connects to a write enable line 273, a third input connects to the memory cycle line 7 and its output terminal connects to the read/write memory control line 6.

Figure 14A:
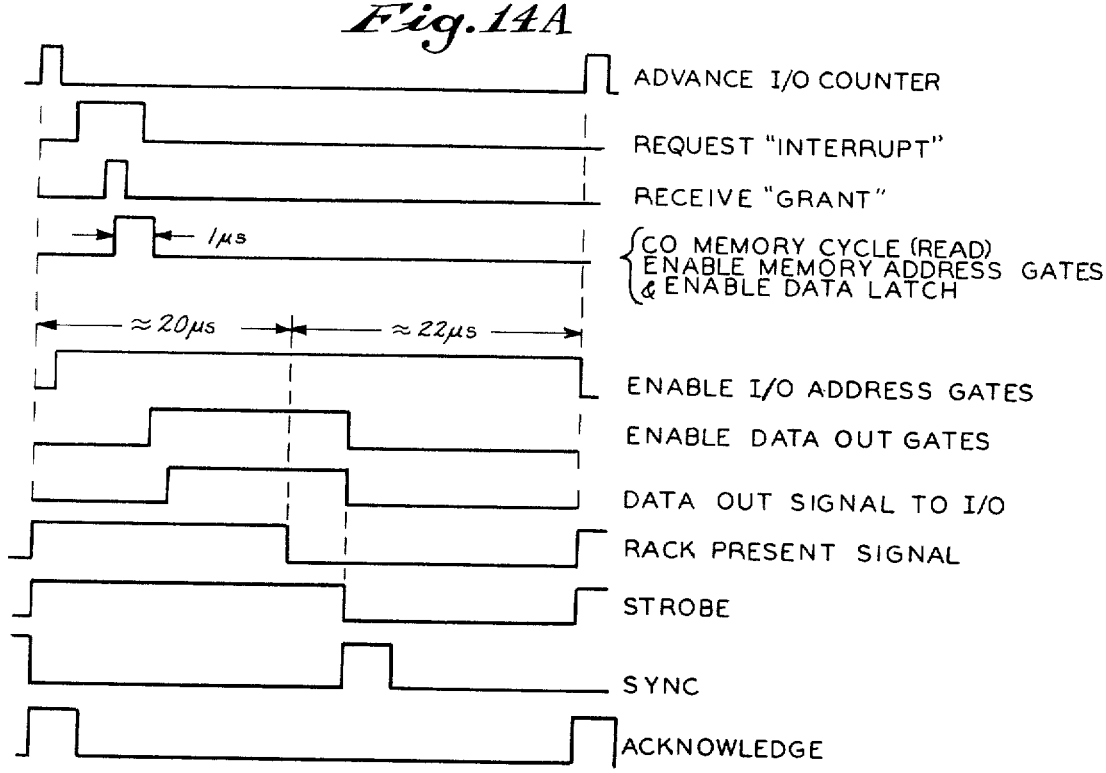

Referring to FIGS. 8, 9 and 14A and B, the input/output scanner circuit 15 executes a data output sequence which couples a status word in the output image table 2 to a corresponding slot in the interface circuitry. This is followed by a data input sequence in which the status of the same I/O slot is coupled to the input image table 3. For example, assume that the binary counter 246 is in its reset, or zero, state and that a logic one is generated at the A output of the binary counter 247. The octal address 10 is generated on the scanner address bus 248 and a logic low voltage is generated on the input/output line 270 to indicate that a data output sequence is to be executed. The scanner control circuit 225 generates an interrupt request on the line 16 and when a logic high is received on the grant line 17 a CO memory cycle is executed by the programmable controller. The read-write memory control line 6 is driven to a logic high (read) by the NAND gate 272, the memory address gate 249 is enabled and the data latch 228 is enabled to read the status word on memory line 10 (octal) during the CO memory cycle. The status work is retained in the data latch 228 until the CO memory cycle i completed and the data out gates 230 are then enabled to apply the status word to the I/O data bus 18. Also, immediately following the completion of the CO memory cycle, the scanner control circuit 225 generates a logic high data out signal to the interface circuitry through a data out line 275. If interface rack number one is present, and operative, a logic low rack present signal is generated on the rack present line 263 and coupled to the I/O address counter 245. A strobe line 277 connects the scanner control circuit 225 to each interface rack 19 and in response to the logic high on the data out line 275, the strobe line 277 is driven to a logic low voltage by the rack adapter circuit 23 associated with the addressed interface rack number one. As will be described in more detail hereinafter, a logic high voltage is generated on the sync line 265 in response to the logic low on the strobe line 277. Also, the logic low strobe signal drives the out line 275 to a logic low voltage and this change in logic state is echoed by the addressed rack adapter circuit 23 which drives the strobe line 277 high Concurrently, the acknowledge line 266 is driven to a logic high voltage. The signals which are conveyed between the scanner circuit 15 and the interface racks 19 insure that data is properly coupled during each data output and data input sequence.

Referring particularly to FIG. 9, when the proper sequence of operation is confirmed by the logic state of the strobe line 277, the I/o address counter 245 is advanced one count each time the acknowledge line 266 goes high. The flip-flop 260 is driven to a reset state when the rack present line 263 is low and a logic high is generated on the sync line 265. As a result, at the end of the output sequence, the logic high voltage at its $\overline{Q}$ output 259 is gated through the AND gate 256 by the acknowledge signal on the line 266 and applied to the input 255 of the binary counter 246. The counter 246 is thus advanced one count to generate a logic high at its A output terminal. A data in sequence is now executed by the I/O scanner circuit 15. Although the octal address on the leads 0–5 remains at 10 (octal) to address interface rack number one, a logic high voltage is now generated on address lead number 6 in the scanner address bus 248 to address line number 110 (octal) in the input image table 3 of the memory 1.

Figure 14B:
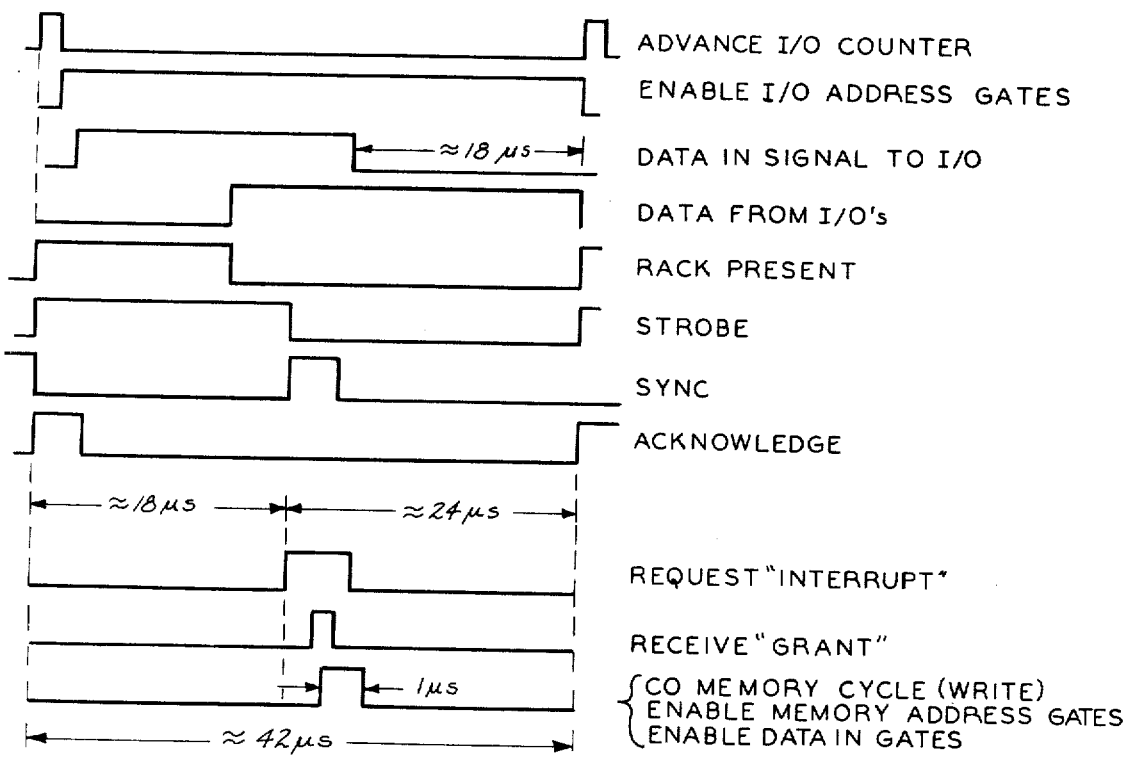

Referring particularly to FIG. 14B, the data input sequence is commenced by enabling the I/O address gates 251. The scanner control circuit 225 then generates a logic high voltage on a data in control line 276 which is connected to the interface racks 19 and which results in the strobe line 227 being driven to a logic low voltage. The scanner control circuit 225 in response then generates a logic high voltage on the interrupt line 16 and when the interrupt is granted, a CO memory cycle is immediately executed and the status of each bit in rack number one, slot zero, is written into memory line 110 (octal) by enabling the memory address gates 249 and enabling the data in gates 226.

The strobe line is then driven high by the rack adaptor 23 on the addressed interface rack and this in turn generates a logic high voltage on the acknowledge line 266. A logic high is thus gated to the binary counter input terminal 255 in the I/O address counter 245 and it is advanced one count to generate a logic high voltage at its B output terminal. The data output sequence is then repeated followed by another data input sequence. The I/O address counter 245 is continuously advanced to scan all of the slots in the interface racks 19 and to thereby read each line of the output image table 2 from the memory 1 and write over each line in the input image table 2. The rate at which the scanner circuit 15 executes each sequence is determined primarily by the delays imposed by the various filter circuits in the lines linking the scanner circuit 15 to the interface racks 19. On the average, each sequence requires approximately 42 microseconds.

In many instances the programmable controller is not operated at maximum capacity and some of the interface racks 19 are not occupied. When this occurs, the rack present line is not driven to a logic low voltage in response to the data in or data out signals from the scanner control circuit 225 and the flip-flop 260 in the I/O address counter 245 is set to generate a logic high voltage at its Q output terminal 261. As a consequence, when the acknowledge signal is generated on the line 266, it is gated through the AND gate 258 and applied to the input 269 of the binary counter 247. The counter 247 is thus advanced one count to address the next interface rack 19 and the binary counter 246 is reset to zero through its terminal 257.

Figure 10A:
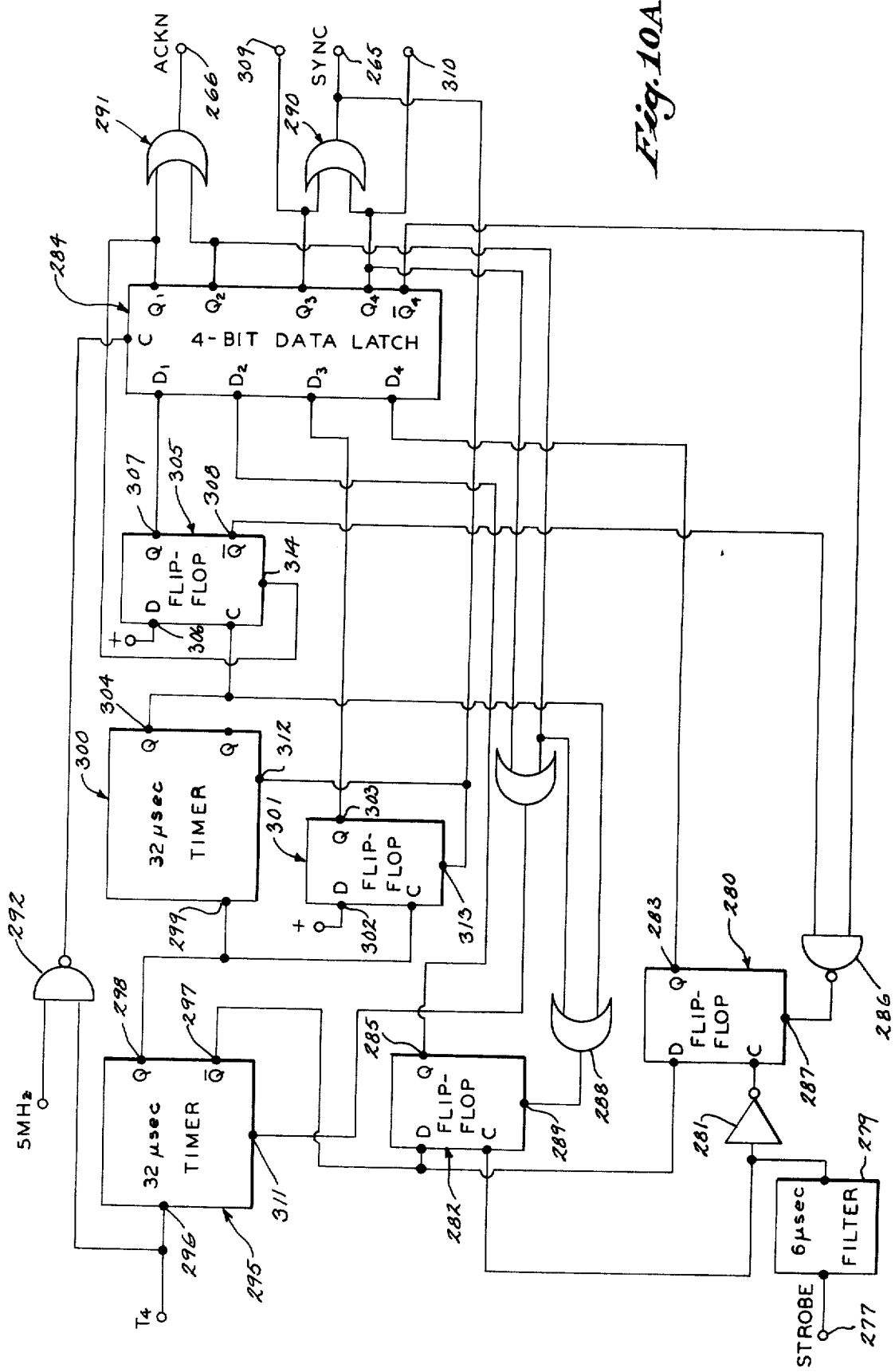

The scanner control circuit 225 coordinates the various elements of the scanner circuit 15 to perform the data input and data output sequences. Referring specifically to FIG. 10A, the strobe line 277 enters the scanner control circuit 225 through a filter circuit 279 and couples through an inverter gate 281 to a clock terminal on a D-type flip-flop 280. The strobe line 277 also connects to a clock terminal on a second D-type flip-flop 282. A Q output terminal 283 on flip-flop 280 connects with a D4 input terminal on a four-bit data latch 284 and a Q output terminal 285 on the flip-flop 282 connects to the D2 input of the data latch 284. The data latch 284 is commercially available from Texas Instruments, Inc. as SN74175, and it includes a $\overline{Q4}$ output terminal which connects through a NAND gate 286 to a reset terminal 287 on the flip-flop 280 and a Q2 output terminal which connects through an OR gate 288 to a reset terminal 289 on the flip-flop 282. The Q4 output terminal on the data latch 284 also connects through an OR gate 290 to the sync line 265, and its Q2 output terminal also connects through an OR gate 291 to the acknowledge line 266. The Q4 output also connects to a true sync line 310.

As described above and shown in FIGS. 14A and 14B, the strobe line 277 is driven to a logic low voltage by an addressed interface rack 19 in response to either a data out or data in signal generated by the scanner control circuit 225. This logic state transition is inverted by the gate 281 to clock the flip-flop 280. A logic high voltage is applied to the D input of the flip-flop 280 during the transition, and a logic high is thus generated at its Q output 283. The four-bit data latch 284 is clocked by a T4.CL timing pulse received through a NAND gate 292 and the logic high voltage at Q output terminal 283 is stored at the Q4 output of the data latch 284 and applied through the Or gate 290 to the sync line 265. On the other hand, when the strobe line 277 is driven to a logic high voltage at the end of each data input or data output sequence, the flip-flop 282 is clocked and the logic high at its D input terminal is generated at its Q output terminal 285. This is applied to the D2 input terminal on the 4-bit data latch 284 and is clocked into the data latch 284 by the next T4.CL timing pulse. A logic high voltage is thus generated at the data latch Q2 output terminal and is applied to the acknowledge line 266 through the OR gate 291. The flip-flops 280 and 282 are reset when the sync or acknowledge signal is clocked into the data latch 284 with a T4.CL timing pulse, and one microsecond later the data latch 284 is reset by the T4.CL timing pulse. The sync and acknowledge signals are thus logic high voltage pulses of one microsecond duration.

If an addressed slot or rack is not present in the programmable controller, the logic state of the strobe line 277 is not changed during a data input or data output sequence. Consequently, timer circuitry is provided to generate logic high voltages on the sync line 265 and the acknowledge line 266 to advance the I/O address counter 245 in the absence of a return signal on the strobe line 277. Referring particularly to FIG. 10A, a thirty-two-microsecond timer circuit 295 has an input terminnal 296 which connects to receive the T4 timing pulse in the timing bus 12, a Q output terminal 298 which connects to the input 299 of a second thirty-two-microsecond timer circuit 300, and a Q̄ output terminal 297 which connects to the D inputs on flip-flops 280 and 282. The Q output 298 is also connected to the clock terminal on a third D-type flip-flop 301, and a D input terminal 302 on the flip-flop 301 connects to a logic high voltage source. A Q output terminal 303 on flip-flop 301 connects to the D3 input terminal on the four-bit data latch 284. A Q output terminal 304 on the second timer circuit 300 connects to a clock terminal on a fourth D-type flip-flop 305 and through the OR gate 288 to the reset terminal 289 on the second flip-flop 282. A D input terminal 306 on the flip-flop 305 connects to a logic high voltage source, its Q output terminal 307 connects to the D1 input on the data latch 284, and its Q̄ output terminal 308 connects through the NAND gate 286 to the reset terminal 287 on the first flip-flop 280. The Q1 output on the data latch 284 connects to a second input on the OR gate 291 and its Q3 output terminal connects to a second input terminal on the OR gate 290 and an artificial sync line 309.

After each data in or data out sequence is executed by the input/output scanner circuit 15, the first 32-microsecond timer 295 is set by a T4 timing pulse. If the strobe line 277 does not change logic state during the next 32 microseconds, the timer 295 times out and generates a logic high voltage at its Q output terminal 298 which clocks the flip-flop 301. As a result, a logic high voltage is clocked into the data latch 284 through the D3 input by the next T4.CL timing pulse and a logic high voltage is generated on the sync line 265 through the OR gate 290. The second 32-microsecond timer 300 times out 32 microseconds later and clocks the fourth flip-flop 305. A logic high voltage is thus generated at its Q output 307 and is clocked into the D1 input of the data latch 284. A logic high voltage is thus generated at the data latch Q1 output and is coupled through the OR gate 291 to the acknowledge line 266. Thus, in the absence of a strobe signal from the addressed interface rack, artificial sync and acknowledge signals are generated to advance the I/O address counter 245 and initiate the next data in or data out sequence. The timer circuits 295 and 300 are reset through reset terminals 311 and 312 and the flip-flops 301 and 305 are reset through reset terminals 313 and 314.

Figure 10B:
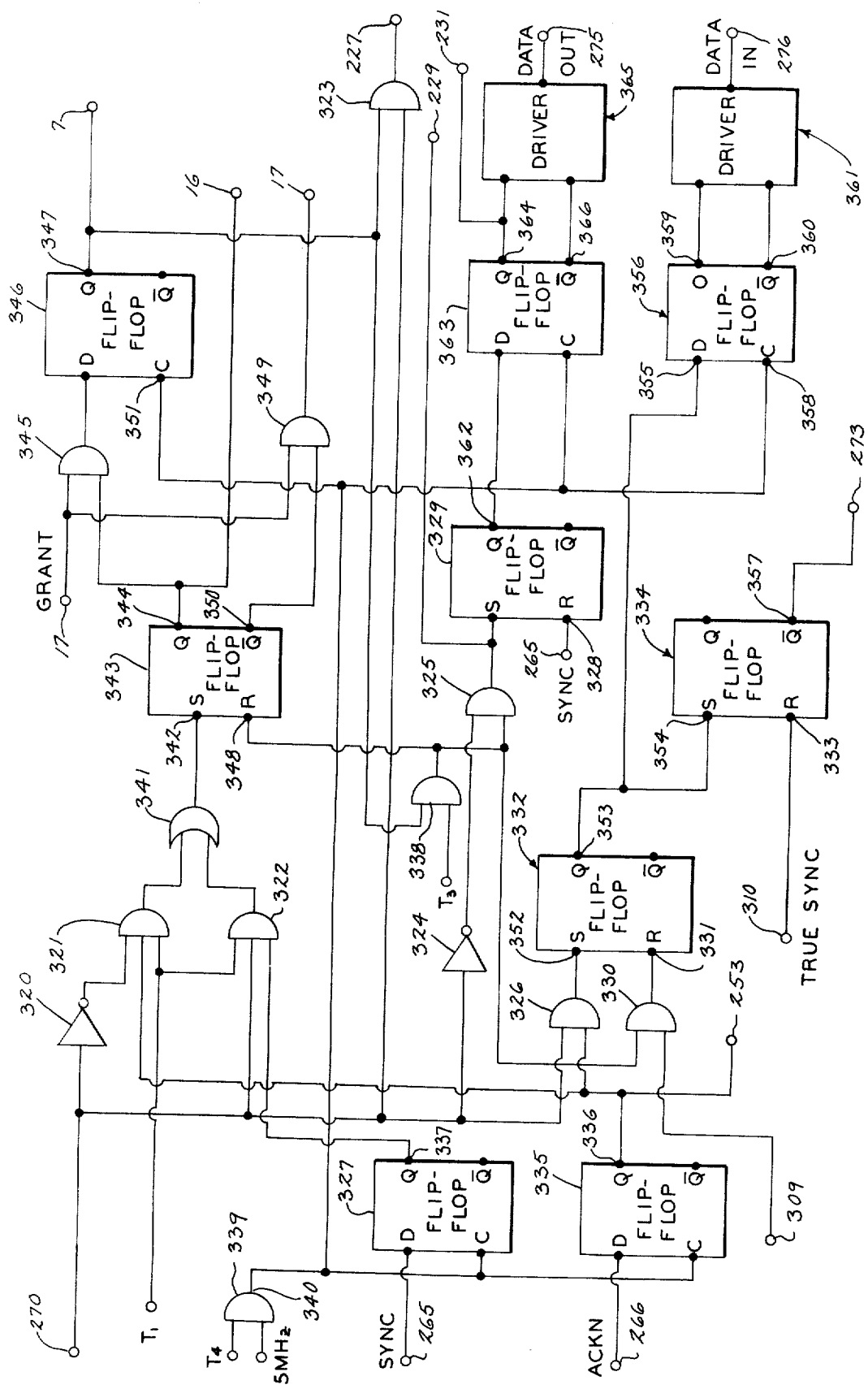

The sequence of steps preformed by the scanner circuit 15 during each data input sequence and data output sequence is controlled by the scanner control circuit 225. Referring particularly to FIGS. 8 and 10B, whether a data input sequence or data output sequence is to be executed in determine by the logic state of the input-output line 270 which connnects through an inverter gate 320 to one input of an AND gate 321. The line 270 also connects to an input on an AND gate 322, to an input on an AND gate 323, through an inverter gate 324 to an AND gate 325, and to one input on an AND gate 326. The sync line 265 is connected to a D input terminal on a first D-type flip-flop 327 and to a reset terminal 328 on a first R-S flip-flop 329. The artificial sync line 309 connects through an AND gate 330 to a reset terminal 321 on a second R-S flip-flop 332 and the true sync line 310 connects to a reset terminal 333 on a third R-S flip-flop 334. The acknowledge line 266 connects to a D input terminal on a second D-type flip-flop 335. A Q output terminal 336 on the flip-flop 335 connects to the enable line 253 which drives the I/O address gates 251, and it connects to second inputs on the AND gates 321 and 326. A Q output terminal 337 on the first D-type flip-flop 327 connects to a second input on the AND gate 322.

The timing bus 12 connects to the scanner control circuit 225 to coordinate its operation with that of the processor 10. A third input on each of the AND gates 321 and 322 connects to receive the T1 timing pulse, and AND gate 338 connects to receive the T3 timing pulse. The T4 timing pulse and the five megahertz clock are applied to an AND gate 339 to generate a T4.CL timing pulse at its output terminal 340.

The outputs of the AND gated 321 and 322 couple through an OR gate 341 to a set terminal 342 on an interrupt request flip-flop 343. The interrupt request flip-flop 343 is an R-S flip-flop having a - output terminal 344 which connects to the interrupt request line 16 and to one input of an AND gate 345. A second input on the AND gate 345 connects to the processor grant line 17 and its output connects to a D input on a memory cycle flip-flop 346. A Q output terminal 347 on the flip-flop 346 connects to the memory cycle control line 7, and it connects to second inputs on the AND gates 323 and 338. The output of the AND gate 323 connects to the enable line 227 which operates the data in gates 226 and the output of the AND gate 338 connects to a reset terminal 348 on the interrupt request flip-flop 343. The grant line 17 from the processor 10 connects to one input on an AND gate 349 and a Q output terminal 350 on the interrupt request flip-flop 343 connects to its second input. The output of the AND gate 349 connects to the grant line 17 that connects to other requesting devices such as the program loader or computer interface shown in FIG. 1.

An interrupt is requested by the scanner control circuit 225 when the interrupt request flip-flop 343 is set by a logic voltage from one of the AND gates 321 or 322. The interrupt request line 16 is driven to a logic high voltage by its Q output terminal 344 and and AND gate 345 is enabled. In response, the processor 10 generates a logic high voltage on the grant line 17 which is clocked into the D terminal of the memory cycle flip-flop 346 by a T4-CL timing pulse received at its clock terminal 351. The memory cycle control line 7 is thus driven to a logic high voltage and a 1 microsecond CO memory cycle is executed. When a T3 timing pulse is received at the AND gate 338 near the end of the CO memory cycle, the interrupt request flip-flop 348 is reset to disable the AND gate 345 and generate a logic low voltage at the D input of the meory cycle flip-flop 346. When the T4.CL timing pulse is subsequently reeived, therefore, the flip-flop 346 is reset and its Q output terminal 347 drops to a logic low voltage.

When the input/output line 270 is at a logic high voltage, a data input sequence is indicated. The sequence begins when the flip-flop 335 is set by a logic high acknowledge on the line 266 and a T4.CL timing pulse. As a result, the AND gate 326 couples a logic high voltage from the input/output line 270 to a set terminal 352 on the flip-flop 332 and a logic high voltage is generated at the Q output 353 and is applied to a set terminal 354 on the R-S flip-flop 334 and a D input 355 on a D-type flip-flop 356. The R-S flip-flop 334 is set to generate a logic low voltage at its $\overline{Q}$ output terminal 357 and the D-type flip-flop 356 is clocked by a T4-CL timing pulse received at its clock terminal 358 to generate a logic high voltage at its Q output 359. The Q output 359 and a $\overline{Q}$ output 360 on the flip-flop 356 connect to the inputs of a driver circuit 361 which connects to the data in control line 276 and which is similar to that shown in FIG. 13 and described above. A logic high voltage is thus generated on the data in control line 276 shortly after the logic high voltage is applied to the knowledge line 266.

As previously described, the addressed interface rack 19 receives the logic high data in signal on the control line 276 and in response drives the strobe line 277 to a logic low voltage. A logic high sync pulse results and is generated on the sync line 265 and the tru sync line 310. The R-S flip-flop 334 is thus reset to drive the write enable line 273 to a logic high voltage and the D-type flip-flop 327 is clocked by a timing pulse T4.CL to initiate an interrupt through the AND gate 322. When the interrupt is granted and the CO memory cycle commenced, the AND gate 323 generates a logic high voltage on the enable line 227 which gates the status word on the I/O data bus 18 to the memory data bus 8. At the completion of the CO memory cycle the AND gate 338 not only resets the interrupt request flip-flop 343, but it also resets the flip-flop 332 through the AND gate 330 to reset the D-type flip-flop 356. As a result, the data in control line 276 is driven to a logic low voltage and the data input sequence is completed.

The data output sequence begins when the strobe line 277 changes logic state in response to the logic low on the data in control line 276. The D-type flip-flop 335 is set by the resulting logic high pulse on the acknowledge line 266 and a T4.CL timing pulse. The input/output line 270 is drivn to a logic low voltage by the I/O address counter 245 and a logic high voltage is generated by the AND gate 321 during the T1 timing pulse to set the interrupt request flip-flop 343. The request is granted by the processor 10 as described above, and a CO memory cycle is initiated by the logic high voltage on the memory cycle control line 7. The addressed word in the memory 1 is read out onto the memory data bus 8 and when the T3 timing pulse is received by the AND gate 338 a logic high voltage is generated at its output to enable the AND gate 325. A logic high voltage is thus generated on the data latch control line 229 to store the status word in the bus 8 in the data latch 228. Concurrently, the R-S flip-flop 329 is set to generate a logic high at its Q output terminal 362 and a D-type flip-flop 363 is clocked by the T4.CL timing pulse which follows. A Q output terminal 364 on the flip-flop 363 connects to one input of a driver circuit 365 and its output terminal connects to the data out control line 275. The Q otuput terminal 364 also connects to the enable line 231 and the logic high voltage thereon enables the data out gated 230 to couple the status word stored in the data latch 228 to the I/O data bus 18. A $\overline{Q}$ output terminal 366 on the flip-flop 363 also connects to the driver circuit 365 which is similar to the driver circuit 361. In response to the logic high on the data out control line 275, the addressed interface rack 19 which receives the status word on the bus 18 drives the strobe line 277 to a logic low voltage. A logic high voltage on the sync line 265 results and this is applied to the reset terminal 328 on the R-S flip-flop 329 to reset its Q output terminal 362 to a logic low voltage. The D-type flip-flop 363 is also reset when the T4.CL timing pulse is received and the data out control line 275 is driven to a logic low voltage. The next data input sequence is then initiated by the change in logic state which occurs on the strobe line 277 and the data input sequence and data output sequence are thus alternately executed to continuously scan all of the input/output slots in the interface racks 19.

Figure 11:
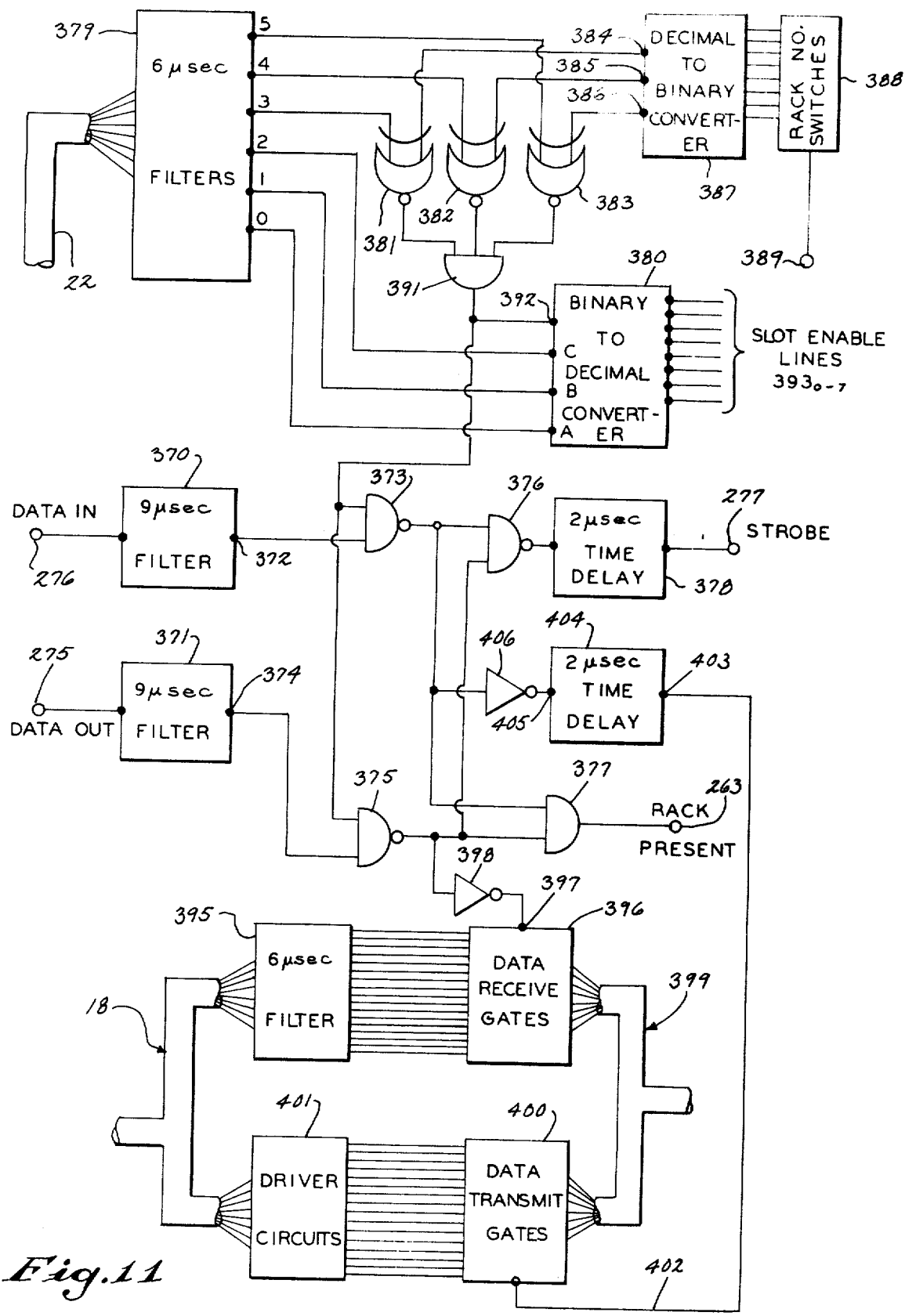
FIG. 11 is an electrical schematic diagram of a rack adapter which forms part of the programmable controller in FIG. 1.

The rack adapter circuit 23 on each interface rack 19 coordinates the data transfer between the I/O slots and the input/output scanner circuit 15. Referring particularly to FIGS. 1 and 11, the data in control line 276 is connected to each rack adapter 23 through a nine-microsecond filter circuit 370. Similarly, the data out control line 275 is connected to each rack adapter 23 through a nine-microsecond filter circuit 371. An output terminal 372 on the filter 370 connects to one input on a NAND gate 373 and an output terminal on the filter 371 connects to one input of a second NAND date 375. The output of the NAND gate 373 connects to one input on a third NAND gate 376 and to one input of an AND gate 377. The output of the second NAND gate 375 connects to second inputs on each of the gates 376 and 377. The output of the third NAND gate 376 connects through a 2 microsecond time delay circuit 378 to the strobe line 277 and the output of the AND gate 377 connects to the rack present line 263.

The NAND gates 373 and 375 are enabled when the rack address is generated on the I/O address bus 22. The I/O address bits 0–5 are each coupled through one of six six-microsecond filter circuits indicated collectively at 379, and the three least significant bit numbers 0, 1 and 2 are connected to the A, B and C input terminals of a binary-to-decimal converter circuit 380 such as SN7442 available from Texas Instruments, Inc. The three most significant bit numbers 3, 4 and 5 are each coupled to one input of three exclusive NOR gates 381–383. A second input on each of the exclusive NOR gates 381–383 connects to one of three output terminals 384–386 on a decimal-to-binary converter circuit 387. The decimal-to-binary converter circuit 387 is commercially available from Texas Instruments, Inc. as SN74147 and includes eight input terminals that connect through eight rack number switches 388 to a logic high voltage terminal 389. The converter circuit is responsive to a logic high voltage applied to one of its input terminals 0–7 to generate the corresponding binary number at its three outputs 384–386. Thus, by closing one of the rack number switches 388, the interface rack 19 is assigned a three-bit binary address, or rack number. The output of each exclusive NOR gate 381–383 connects through an AND gate 391 to an enable terminal 392 on the binary-to-decimal converter 380 and to the second input of each NAND gate 373 and 375.

When the assigned rack address corresponds to that generated on the three most significant bit leads of the I/O address bus 22, the outputs of each exclusive NOR gate 381-383 is at a logic high voltage. This is coupled through the AND gate 391 to enable the binary-to-decimal converter 380. The slot address on the three least significant bit leads O, 1 and 2 of the I/O address bus 22 are thus decoded to generate a logic low voltage on one of the eight slot enable lines $393_{0-7}$. Also, the NAND gates 373 and 375 are enabled to couple the logic state of the data out control line 275 and the data in control line 276 to the strobe line 277. Consequently, the logic state of the strobe line 277 is responsive to the logic state of either the data out control line 275 or the data in control line 276 to confirm that the addressed interface rack 19 is present and operative. Also, the rack present line 263 is driven to a logic low voltage when a logic high voltage is received at either data line 275 or 276.

The sixteen data lines in the I/O data bus 18 are received by the rack adapter circuit 23 at a set of 16 6 microsecond filter circuits indicated collectively at 395. The output of each filter circuit 395 is coupled to an input terminal on one of 16 data receive gates indicated collectively at 396. The data receive gates 396 are AND gates and a second input on each is commonly connected to an enable terminal 397. The enable terminal 397 is coupled to the output of the NAND gate 375 by an inverter gate 398 and the output on each data receive gate 396 is connected to a lead in a slot data bus 399. Each of the leads in the slot data bus 399 connects to an input or output circuit in one of the slots 0-7 and when the NAND gate 375 is enabled by a logic high voltage on the data out control line 275, the status word on the I/O data bus 18 is gated through the data receive gates 396 to the enabled slot.

The slot data bus 399 is also coupled to the I/O data bus 18 through a set of sixteen data transmit gates 400 and associated driver circuits 401. The data transmit gates 400 and associated drivers 401 are identical to the data out gates 230 and associated driver circuits 233 shown in FIG. 13 and described above. The enable terminal on each gate 400 is commonly connected through an enable line 402 to the output terminal 403 of a 2 microsecond time delay circuit 404. An input terminal 405 on the circuit 404 couples to the output of the NAND gate 373 through an inverter gate 406, and when a logic high voltage is generated on the data in control line 276, a logic high enabling signal is generated on the lead 402 to the data transmit gates 400. The status of each input or output device in the enabled slot is thus gated to the I/O data bus 18.

Figure 15:
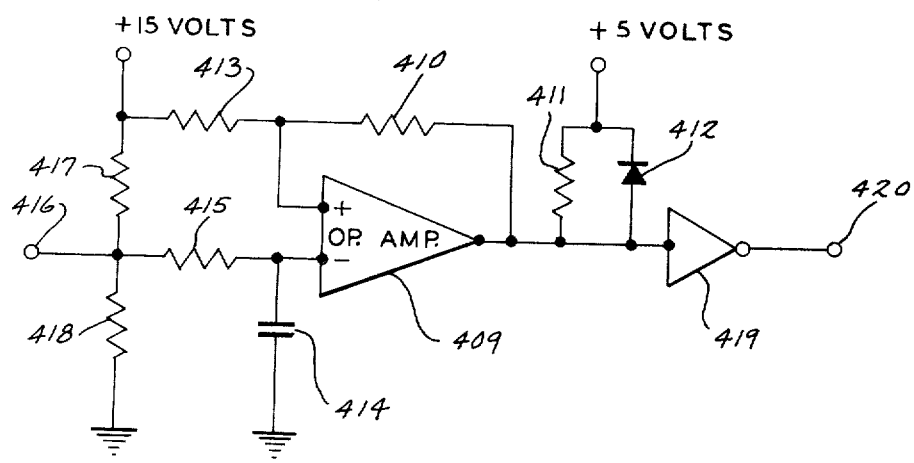
FIG. 15 is an electrical schematic diagram of a filter circuit which is used throughout the programmable controller of FIG. 1.

The filter circuit used throughout the invented programmable controller is shown in FIG. 15. It includes an operational amplifier 409 which has its output connected through a feedback resistor 410 to its noninverting input. Its output is also coupled through a resistor 411 and diode 412 to a positive 5 volt supply terminal. Its noninverting input also connects through a resistor 413 to a positive fifteen-volt supply terminal and its inverting input connects through a capacitor 414 to circuit ground and through a coupling resistor 415 to the circuit input terminal 416. The circuit input terminal 416 is coupled to the positive fifteen-volt supply terminal by a resistor 417 and is coupled to circuit ground by a resistor 418. The output of the operational amplifier 409 is coupled through an inverter gate 419 to the output 420 of the circuit. The values of the capacitor 414 and resistor 415 are selected to provide the desired filtering.

I claim:

1. A programmable controller for operating a controlled system having a plurality of input and output devices the combination comprising:

a random access memory which stores a set of instructions that comprise a control program, which stores a first set of status bits that comprise an input image table and that correspond to input devices on the controlled system, and which stores a second set of status bits that comprise an output image table and that correspond with output devices on the controlled system;

a processor connected directly to said random access memory and including means for continuously cycling said random access memory to execute said control program and to thereby update the status of said output image table in response to the status of said input image table;

interface circuitry connected to the input and output devices on said control system for converting signals from said input devices which are indicative of their status to corresponding logic level signals and for converting logic level signals to signals for driving said output devides to an indicated status; and a scanner circuit connected directly to said random access memory and to said interface circuitry, said scanner circuit including means connected to said processor for interrupting the operation of said processor to steal a memory cycle, date input means operable during an interrupt to couple the status of selected input devices from said interface circuit to the input image table, and data output means operable during an interrupt to couple the status of selected bits in said output image table to the interface circuit for driving corresponding selected output devices on said controlled system, wherein the status bits which comprise said input and output image tables are stored in separately addressable lines in said random access memory, each of which lines contains a plurality of status bits, said scanner circuit includes an I/O address counter which addresses one line in said random access memory during each interrupt, and all the status bits in said addressed line are coupled with said interface circuit during the interrupt.

2. The programmable controller as recited in claim 1 in which the scanner circuit continuously and relatively periodically interrupts the operation of the processor, said I/O address counter alternately addresses lines in said input image table and output image table, and said scanner circuit includes means for enabling said data input means and said data output means during alternate interrupts.

3. In a programmable controller, the combination comprising:

means for storing an input image table which stores the status of input devices connected to the programmable controller;

means for storing an output image table which stores the status of output devices connected to the programmable controller;

means for storing a control program containing a plurality of program instructions;

a processor for sequentially and cyclically executing the program instructions, said processor including means connected to said input image table storage means for examining the status of selected bits stored therein in response to selected program instructions and including means connected to said output image table storage means for setting the status of selected bits stored therein in response to other selected program instructions; and a scanner circuit connected to said input and output image table storage means and said processor, said scanner circuit including means for periodically interrupting the operation of said processor, means for coupling the status of selected bits stored in said input image table storage means with input devices connected to said programmable controller during an interrupt, and means for coupling the status of selected bits stored in said output image table storage means with output devices connected to said programmable controller during an interrupt.

4. The programmable controller as recited in claim 3 in which said scanner circuit includes counter means connected to said input and output image table storage means for selecting a set of bits stored therein during each interrupt, and said scanner circuit includes means for advancing said counter means between interrupts to select another successive set of bits stored in said input and output image table storage means during the next interrupt.

5. The programmable controller as recited in claim 4 in which an interface rack connects said scanner circuit coupling means to a set of said input devices, and said interface rack includes an adapter circuit which generates a strobe signal to said scanner circuit when data is coupled from said input devices in said set, and said means for advancing said counter means is responsive to said generated strobe signal to advance said counter means.

6. The programmable controller as recited in claim 5 in which said interface rack also connects said scanner circuit coupling means to a set of said output devices, and the adapter circuit generates a strobe signal to said scanner circuit when data is coupled to said set of output devices by said scanner circuit, and said means for advancing said counter means is responsive to said generated strobe signal to advance said counter means.

7. A programmable controller, the combination comprising:
   a random access memory which stores a control program comprised of a plurality of program instructions, an input image table that contains a plurality of status bits which correspond to input devices connected to the programmable controller, and an output image table that contains a plurality of status bits that correspond to output devices connected to the programmable controller;
   a processor connected to said random access memory and including a program instruction counter for sequentially reading said program instructions out of said memory, means for examining the logic state of selected status bits in said input image table in response to selected program instructions read from said memory, and means for setting the logic state of selected status bits in said output image table in response to other selected program instructions read from said memory; and
   a scanner circuit connected to said random access memory and including I/O address counter means for selecting sets of status bits in said output image table and said input image table, said scanner circuit further including interrupt means connected to said processor for generating a request signal to said processor, said scanner circuit also including coupling means operable in response to a grant signal received from said processor to couple a selected set of status bits in said image tables with their corresponding input and output devices.

8. The programmable controller as recited in claim 7 which includes an interface rack connected to said scanner circuit and connected to a plurality of sets of input and output devices connected to the programmable controller, said interface rack including means responsive to the I/O address counter means in said scanner circuit for coupling one of said sets of devices to said scanner circuit.

9. The programmable controller as recited in claim 8 in which an I/O data bus couples status data between said interface rack coupling means and said scanner circuit coupling means and a memory data bus couples status data between said scanner circuit coupling means and said random access memory, and in which said scanner circuit coupling means includes data in gate means for coupling status data on said I/O data bus to said memory data bus and data out gate means for coupling status data on said memory data bus to said I/O data bus.

10. The programmable controller as recited in claim 9 in which said scanner circuit includes control means for alternately executing a data output sequence and a data input sequence, said control means being connected to said interrupt means, connected to said data in gate means and connected to said data out gate means, and being operable to enable said interrupt means and said data out gate means during said data output sequence, and to enable said interrupt means and said data in gate means during said data input sequence.

11. The programmable controller as recited in claim 10 in which said control means includes means connected to said interface rack for generating a data out signal to said interface rack during said data output sequence and for generating a data in signal to said interface rack during said data input sequence, and said interface rack includes gate means connected to said control means for receiving said data in and data out signals and generating a strobe signal to said scanner circuit which initiates the next data input or data output sequence.

12. The programmable controller as recited in claim 11 in which said scanner circuit control means includes time delay means connected to the interface rack gate means, said time delay means being reset at the commencement of each data output and data input sequence and including means for initiating the next data transfer sequence when no strobe signal is received from said interface rack and a preset time interval elapses.

13. The programmable controller as recited in claim 7 in which said processor includes memory cycle counter means for cycling the random access memory a predetermined number of times in response to an operation code in each program instruction read from said memory, and including enabling means for incrementing said program instruction counter after each program instruction is completely executed.

14. The programmable controller as recited in claim 13 in which said memory cycle counter means connected to said scanner circuit includes means for receiving said request signal from said scanner circuit and generating said grant signal to said scanner circuit after the program instruction then being executed is completed.

15. A programmable controller, the combination comprising:
a random access memory which stores a control program comprised of a plurality of program instructions, an input image table that contains a plurality of status bits which correspond to input devices connected to the programmable controller, and an output image table that contains a plurality of status bits that correspond to output devices connected to the programmable controller;
a processor connected to said random access memory and including a program instruction counter for sequentially reading said program instructions out of said memory, means for examining the logic state of a selected status bit in said input and output image tables in response to a selected program instruction read from said memory, and means for setting the logic state of a selected status bit in said output image table in response to another selected program instruction read from said memory; and
a scanner circuit connected to said random access memory and said processor, said scanner circuit including I/O address counter means for selecting a set of status bits in said input and output image tables and for concurrently selecting the corresponding set of devices on the controlled system, said scanner circuit also including means for coupling said selected set of status bits between said input and output image tables and its corresponding set of devices.

16. The programmable controller as recited in claim 15 which includes a plurality of interface racks, each interface rack including:
means for coupling a selected one of a plurality of sets of devices on said controlled system to said scanner circuit coupling means; and
means responsive to said I/O address counter means for selecting said one set of devices for coupling to said scanner circuit,
wherein said scanner circuit includes means for periodically advancing said I/O address counter means to sequentially select each set of devices in each interface rack.

17. The programmable controller as recited in claim 16 in which each interface rack includes means connected to said scanner circuit for generating a rack present signal and said scanner circuit includes means for receiving said rack present signal and means for advancing said I/O address counter in increments in one when said rack present signal is received and for advancing it in increments of more than one when said rack present signal is not received.

18. A programmable controller for operating a controlled system, the combination comprising:
a random access memory which stores a set of instructions that comprise a control program, which stores an input image table that contains status bits that correspond to input devices on the controlled system, and which stores an output image table that contains status bits that correspond to output devices on the controlled system, said control program including status bit instructions which identify a selected status bit to be operated upon and which includes an operation code that identifies a selected operation to be performed on the identified status bit;
a processor connected directly to the random access memory and including program instruction counter means for sequentially reading out of memory said control program insructions, means responsive to status bit instructions read from said memory for reading out of memory the selected status bit identified by a status bit instruction, and means responsive to the operation code in a status bit instruction read from memory for performing the identified selected operation on the identified status bit read from said memory, said processor being operable to cyclically execute the control program and to thereby continuously update the status of the output image table in response to the status of the input image table; and
a scanner circuit connected directly to said random access memory and coupled to the input and output devices on the controlled system, said scanner circuit having I/O address counter means for addressing sets of status bits in said random access memory and scanner control means connected to said processor and said random access memory for periodically interrupting operation of said processor and coupling an addressed set of status bits between said random access memory and the controlled system.

19. The programmable controller as recited in claim 18 in which said processor means for performing the identified selected operation in each status bit instruction includes means for decoding the operation code in each program instruction read from the random access memory and a logic unit which is connected to the decoding means and is connected to receive each selected status bit read from the random access memory, said logic unit comprising:
a rung flip-flop connected to receive a selected status bit at an input when enabled;
a branch flip-flop connected to receive a selected status bit at an input when enabled;
gate means connected to said operation decoder and responsive to BST and BND operation codes in program instructions read from the memory to enable said rung flip-flop and said branch flip-flop;
a branch store flip-flop having an input connected to said branch flip-flop and being responsive to a BST operation code in a program instruction read from memory to store the logic state of said branch flip-flop;
gate means connected to said branch flip-flop and said branch store flip-flop for coupling the logic state of each to said rung flip-flop in response to a BND operation code in a program instruction read from memory; and
gate means connected to said rung flip-flop for driving a status bit selected by a status bit instruction read from memory to a logic state determined by the state of the rung flip-flop and the operation code in the same status bit instruction read from memory.

20. The programmable controller as recited in claim 18 in which said processor means for performing the identified selected operation in each status bit instruction includes means for decoding the operation code in each program instruction read from the random access memory by said program instruction counter means; and a memory cycle counter which connects to said random access memory, connects to said program instruction counter means and connects to said operation decoding means; said memory cycle counter being responsive to each selected operation code in a program instruction read from memory to cycle the memory a preset number of times to execute the instruction and including means for advancing said program instruction counter means after the execution of each instruction.

21. The programmable controller as recited in claim 20 in which said memory cycle counter includes means connected to said scanner control means for receiving and storing an interrupt request signal from said scanner circuit and for granting a memory cycle to said scanner circuit when the program instruction then being executed is completed.

* * * * *

UNITED STATES PATENT OFFICE
CERTIFICATE OF CORRECTION

PATENT NO. : 3,942,158

DATED : March 2, 1976

INVENTOR(S) : Ernst Dummermuth

It is certified that error appears in the above-identified patent and that said Letters Patent are hereby corrected as shown below:

| | |
|---|---|
| Column 1, line 35 | "cntroller" should be -- controller -- |
| Column 1, line 63 | "with" should be -- within -- |
| Column 2, line 44 | "randon" should be -- random -- |
| Column 2, line 50 | "foregoing" should be -- following -- |
| Column 2, line 64 | "Fig. 1." should be -- Fig. 1, -- |
| Column 3, line 23 | "input/output circuit" should be -- input/output scanner circuit -- |
| Column 3, line 68 | "memory bus" should be -- memory address bus -- |
| Column 4, line 20 | "status bus" should be -- status bit -- |

(continued)

UNITED STATES PATENT OFFICE
CERTIFICATE OF CORRECTION

PATENT NO. : 3,942,158
DATED : March 2, 1976
INVENTOR(S) : Ernst Dummermuth

It is certified that error appears in the above-identified patent and that said Letters Patent are hereby corrected as shown below:

Column 4, Table I

TABLE I

| OPERATION | OP CODE | POINTER | OPERAND ADDRESS | Execution Time |
|---|---|---|---|---|
| XIC/XOE<br>XIO/XOD | 0 0 1 0<br>0 0 1 1 | | | 2 usec. |
| OTU<br>OTL<br>OTD<br>OTE | 1 1 0 0<br>1 1 0 1<br>1 1 1 0<br>1 1 1 1 | | | 3 usec. |
| INSTRUCTION BIT NUMBER (OCTAL) | 17 16 15 14 | 13 12 11 10 | 7 6 5 4 3 2 1 0 | |

Column 6, line 12    "If" should be -- Is --

Column 6, line 62    "to", first occurrence, should be -- as --

Column 6, line 66    "applied" should be -- applies --

Column 7, line 57    "input table" should be -- input image table --

Column 10, line 47    "logic output" should be -- logic input --

Column 12, line 20    "one" should be -- "one" -- (quoted)

(cont'd)

UNITED STATES PATENT OFFICE
CERTIFICATE OF CORRECTION

PATENT NO. : 3,942,158  
DATED : March 2, 1976  
INVENTOR(S) : Ernst Dummermuth

3rd of 5 sheets

It is certified that error appears in the above-identified patent and that said Letters Patent are hereby corrected as shown below:

| | |
|---|---|
| Column 13, lines 10, 4, 21, 34, 40, 46 and 53 | "one" should be -- "one" -- (quoted) |
| Column 14, line 13 | "one" should be -- "one" -- (quoted) |
| Column 15, line 6 | insert -- a -- before "K" |
| Column 16, line 1 | "outer terminal" should be -- output terminal -- |
| Column 17, line 11 | "C2.T3.Cl" should be -- C2.T3.CL -- |
| Column 17, line 54 | "rest" should be -- reset -- |
| Column 17, line 63 | "XIC S" should be -- XIC S5 -- |
| Column 18, line 13 | "aparent" should be -- apparent -- |
| Column 18, line 57 | "incudes" should be -- includes -- |
| Column 20, line 9 | "buss" should be -- bus -- |
| Column 20, line 9 | "i/O" should be -- I/O -- |
| Column 20, line 67 | "read-write" should be -- read/write -- |
| Column 21, line 3 | "work" should be -- word -- |
| Column 21, line 5 | "i" should be -- is -- |
| Column 21, line 25 | insert -- . -- (a period) after "high" |

(cont'd)

UNITED STATES PATENT OFFICE
CERTIFICATE OF CORRECTION

PATENT NO. : 3,942,158

DATED : March 2, 1976

INVENTOR(S) : Ernst Dummermuth

It is certified that error appears in the above—identified patent and that said Letters Patent are hereby corrected as shown below:

| | |
|---|---|
| Column 21, line 54 | "227" should be -- 277 -- |
| Column 23, line 19 | "terminnal" should be -- terminal -- |
| Column 24, line 4 | "in determine" should be -- is determined -- |
| Column 24, line 5 | "input-output" should be -- input/output -- |
| Column 24, line 32 | "gated" should be -- gates -- |
| Column 24, line 35 | "a - output" should be -- a Q output -- |
| Column 24, line 56 | "logic voltage" should be -- logic high voltage -- |
| Column 24, line 58 | "and and AND" should be -- and the AND -- |
| Column 24, line 62 | "T4-CL" should be -- T4.CL -- |
| Column 25, line 1 | "meory" should be -- memory -- |
| Column 25, line 3 | "reeived" should be -- received -- |
| Column 25, line 17 | "T4-CL" should be -- T4.CL -- |
| Column 25, line 25 | "knowledge line" should be -- acknowledge line -- |
| Column 25, line 30 | "tru" should be -- true -- |
| Column 25, line 50 | "drivn" should be -- driven -- |

(cont'd)

UNITED STATES PATENT OFFICE
CERTIFICATE OF CORRECTION

PATENT NO. : 3,942,158  
DATED : March 2, 1976  
INVENTOR(S) : Ernst Dummermuth

It is certified that error appears in the above-identified patent and that said Letters Patent are hereby corrected as shown below:

| | |
|---|---|
| Column 25, line 62 | "in the bus" should be -- on the bus -- |
| Column 26, line 1 | "otuput" should be -- output -- |
| Column 26, line 3 | "gated" should be -- gates -- |
| Column 26, line 31 | "terminal on" should be -- terminal 374 on -- |
| Column 26, line 33 | "date" should be -- gate -- |
| Column 26, line 67 | "of each" should be -- on each -- |
| Column 28, line 25 Claim 1 | insert "suitable" after "signals", second occurrence |
| Column 28, line 26 Claim 1 | "devides" should be -- devices -- |
| Column 28, line 31 Claim 1 | "date" should be -- data -- |
| Column 28, line 46 Claim 1 | "in" should be -- on -- |
| Column 31, line 53 Claim 17 | "in", second occurrence, should be -- of -- |
| Column 32, line 6 Claim 18 | "insructions" should be -- instructions -- |

Signed and Sealed this

Tenth Day of August 1976

[SEAL]

Attest:

RUTH C. MASON  
*Attesting Officer*

C. MARSHALL DANN  
*Commissioner of Patents and Trademarks*